(12) United States Patent
Abrams et al.

(10) Patent No.: US 9,856,039 B2
(45) Date of Patent: Jan. 2, 2018

(54) EXTENDABLE SOLAR ARRAY FOR A SPACECRAFT SYSTEM

(71) Applicant: Analytical Mechanics Associates, Inc., Hampton, VA (US)

(72) Inventors: John Luther Abrams, Englewood, CO (US); Matthew Ernest Duchek, Boulder, CO (US); Alberto Paz, Littleton, CO (US); Ryan Allen Harbach, Lakewood, CO (US)

(73) Assignee: Analytical Mechanics Associates, Inc., Hampton, VA (US)

( * ) Notice: Subject to any disclaimer, the term of this patent is extended or adjusted under 35 U.S.C. 154(b) by 126 days.

(21) Appl. No.: 14/878,883

(22) Filed: Oct. 8, 2015

(65) Prior Publication Data

US 2016/0122041 A1    May 5, 2016

Related U.S. Application Data

(60) Provisional application No. 62/061,575, filed on Oct. 8, 2014.

(51) Int. Cl.
*B64G 1/44* (2006.01)
*B64G 1/22* (2006.01)
*B64G 1/66* (2006.01)

(52) U.S. Cl.
CPC ............ *B64G 1/222* (2013.01); *B64G 1/44* (2013.01); *B64G 1/443* (2013.01); *B64G 1/66* (2013.01)

(58) Field of Classification Search
CPC .. B64G 1/00; B64G 1/22; B64G 1/222; B64G 1/34; B64G 1/407; B64G 1/42;
(Continued)

(56) References Cited

U.S. PATENT DOCUMENTS 3,169,725 A * 2/1965 Berglund ................ B64G 1/12
244/155 R
3,213,573 A * 10/1965 Bohr ....................... B21C 37/10
174/DIG. 11

(Continued)

OTHER PUBLICATIONS

Buchen et al., "2014 Nano/Microsatellite Market Assessment," *SpaceWorks Enterprises, Inc. (SEI)*, 2014; 1-18.

(Continued)

*Primary Examiner* — Tien Dinh
*Assistant Examiner* — Michael A Fabula
(74) *Attorney, Agent, or Firm* — Mueting, Raasch & Gebhardt, P.A.

(57) ABSTRACT

A spacecraft system may include a storage portion (e.g., a first portion and a second portion) and a solar array apparatus that may be configurable in at least a stowed configuration and a deployed configuration. The solar array apparatus may include at least one solar array to collect incident radiation when the solar array apparatus is in the deployed configuration. In one or more embodiments, the at least one solar array may extend away from the storage portion. In one or more embodiments, the at least one solar array may extend between the first portion and the second portion. The solar array apparatus may also include an extendable boom operable to extend the at least one solar array apparatus from the stowed configuration to the deployed configuration.

20 Claims, 19 Drawing Sheets

(58) Field of Classification Search
CPC .......... B64G 1/44; B64G 1/443; B64G 1/446; B64G 1/64; B64G 1/641; B64G 1/66; B64G 1/10; B64G 1/1085; B64G 2001/1092; B64G 2001/244; B64G 2001/643

See application file for complete search history.

(56) References Cited

U.S. PATENT DOCUMENTS

| | | | | |
|---|---|---|---|---|
| 3,362,656 | A * | 1/1968 | Wyatt | B64G 1/32 244/167 |
| 3,363,857 | A * | 1/1968 | Vilbig | B64G 1/10 244/1 R |
| 3,480,232 | A * | 11/1969 | Wyatt | B64G 1/32 244/167 |
| 3,528,543 | A * | 9/1970 | Robinsky | B65D 81/03 428/178 |
| 3,532,299 | A * | 10/1970 | Baker | B64G 1/222 136/245 |
| 3,696,568 | A * | 10/1972 | Berry | E04C 3/005 52/108 |
| 3,735,943 | A * | 5/1973 | Fayet | B64G 1/222 136/245 |
| 3,749,133 | A * | 7/1973 | Bochory | F16L 11/121 138/119 |
| 3,785,590 | A * | 1/1974 | Wentworth | B64G 1/222 136/245 |
| 3,811,633 | A * | 5/1974 | Cummings | B29C 53/20 226/172 |
| 3,817,481 | A * | 6/1974 | Berks | B64G 1/222 136/245 |
| 3,862,528 | A * | 1/1975 | Meissinger | E04C 3/005 242/390.2 |
| 4,047,339 | A * | 9/1977 | Smith | E04C 3/005 52/108 |
| 4,133,501 | A * | 1/1979 | Pentlicki | B64G 1/443 136/245 |
| 4,384,163 | A | 5/1983 | Rauschenbach et al. | |
| 4,426,053 | A * | 1/1984 | Chenin | B64G 1/222 136/245 |
| 4,579,302 | A * | 4/1986 | Schneider | B64G 9/00 136/292 |
| 4,630,791 | A * | 12/1986 | Chapman | B64G 1/14 136/245 |
| 5,228,644 | A * | 7/1993 | Garriott | B64G 1/443 136/245 |
| 5,296,044 | A | 3/1994 | Harvey et al. | |
| 5,314,146 | A * | 5/1994 | Chicoine | B64G 1/10 244/159.4 |
| 5,779,195 | A * | 7/1998 | Basuthakur | B64G 1/007 244/173.1 |
| 5,961,738 | A * | 10/1999 | Benton | B64G 1/44 136/245 |
| 6,016,999 | A * | 1/2000 | Simpson | B64G 1/1007 244/159.5 |
| 6,051,775 | A * | 4/2000 | Brown | B64G 1/222 136/245 |
| 6,206,327 | B1 * | 3/2001 | Benedetti | B64G 1/10 244/159.4 |
| 6,423,895 | B1 | 7/2002 | Murphy et al. | |
| 6,888,513 | B1 * | 5/2005 | Graham | B64G 1/222 343/880 |
| 6,920,722 | B2 * | 7/2005 | Brown | B64G 1/222 226/158 |
| 6,942,186 | B1 * | 9/2005 | Levin | B64G 1/648 244/158.2 |
| 6,983,914 | B2 | 1/2006 | Stribling et al. | |
| 7,617,639 | B1 * | 11/2009 | Pollard | B64G 1/222 343/915 |
| 7,806,370 | B2 * | 10/2010 | Beidleman | B64G 1/222 136/245 |
| 7,895,795 | B1 * | 3/2011 | Murphey | B64G 1/222 52/108 |
| 8,356,774 | B1 * | 1/2013 | Banik | B64G 1/407 244/159.5 |
| 8,636,253 | B1 * | 1/2014 | Spence | B64G 1/222 136/245 |
| 8,683,755 | B1 * | 4/2014 | Spence | B64G 1/222 136/245 |
| 8,770,522 | B1 * | 7/2014 | Murphey | B64G 1/222 244/159.4 |
| 8,816,187 | B1 * | 8/2014 | Stribling | H02S 30/20 126/570 |
| 8,894,017 | B1 * | 11/2014 | Baghdasarian | B64G 1/443 136/245 |
| 8,905,357 | B1 * | 12/2014 | Harvey | B64G 1/007 244/168 |
| 9,004,410 | B1 * | 4/2015 | Steele | B64G 1/443 244/172.7 |
| 9,016,635 | B2 * | 4/2015 | Hoyt | B64G 1/007 244/158.2 |
| 9,120,583 | B1 * | 9/2015 | Spence | B64G 1/222 |
| 9,156,568 | B1 * | 10/2015 | Spence | B64G 1/222 |
| 9,528,264 | B2 * | 12/2016 | Freebury | E04C 3/005 |
| 9,550,584 | B1 * | 1/2017 | Harvey | B64G 1/222 |
| 9,555,904 | B2 * | 1/2017 | Abrams | B64G 1/222 |
| 9,562,630 | B2 * | 2/2017 | Daton-Lovett | B64G 1/222 |
| 9,580,190 | B1 * | 2/2017 | Spence | B64G 1/222 |
| 9,604,737 | B2 * | 3/2017 | Spence | B64G 1/443 |
| 9,605,430 | B2 * | 3/2017 | Baudasse | E04C 3/005 |
| 2002/0112417 | A1 * | 8/2002 | Brown | B64G 1/222 52/108 |
| 2003/0057330 | A1 * | 3/2003 | Deel | B64G 1/222 244/172.8 |
| 2003/0182878 | A1 * | 10/2003 | Warren | E04C 3/005 52/108 |
| 2005/0178921 | A1 * | 8/2005 | Stribling | B64G 1/222 244/172.7 |
| 2006/0185277 | A1 * | 8/2006 | Quincieu | B64G 1/10 52/265 |
| 2006/0207189 | A1 * | 9/2006 | Pryor | B64G 1/222 52/1 |
| 2007/0262204 | A1 * | 11/2007 | Beidleman | B64G 1/222 244/172.6 |
| 2008/0143636 | A1 * | 6/2008 | Couchman | B64G 1/66 343/915 |
| 2009/0057492 | A1 * | 3/2009 | Harris | B64G 1/222 244/164 |
| 2009/0173831 | A1 * | 7/2009 | Roseman | B64G 1/12 244/159.6 |
| 2011/0204186 | A1 * | 8/2011 | Keller | B64G 1/222 244/172.6 |
| 2011/0210209 | A1 * | 9/2011 | Taylor | B64G 1/222 244/172.6 |
| 2011/0253827 | A1 * | 10/2011 | Watanabe | B64G 1/222 242/370 |
| 2012/0012154 | A1 * | 1/2012 | Keller | B64G 1/222 136/245 |
| 2012/0090660 | A1 * | 4/2012 | Keller | B64G 1/222 136/245 |
| 2012/0167943 | A1 * | 7/2012 | Blanchard | B64G 1/222 136/245 |
| 2012/0167944 | A1 * | 7/2012 | Blanchard | B64G 1/44 136/245 |
| 2014/0042275 | A1 * | 2/2014 | Abrams | B64G 1/222 244/172.6 |
| 2014/0151485 | A1 * | 6/2014 | Baudasse | B64G 1/222 242/375 |
| 2014/0230949 | A1 * | 8/2014 | Daton-Lovett | B64G 1/222 138/177 |
| 2014/0263844 | A1 * | 9/2014 | Cook, Jr. | B64G 1/222 244/164 |
| 2015/0102172 | A1 * | 4/2015 | Thurn | B64G 1/40 244/158.2 |
| 2015/0144740 | A1 * | 5/2015 | Turse | B64G 1/44 244/172.6 |

(56) References Cited

U.S. PATENT DOCUMENTS

| | | | | |
|---|---|---|---|---|
| 2016/0010333 A1* | 1/2016 | Freebury | ................ | E04C 3/005 |
| | | | | 52/646 |
| 2016/0023781 A1* | 1/2016 | Baudasse | ............... | B65H 75/28 |
| | | | | 52/108 |
| 2016/0024790 A1* | 1/2016 | Baudasse | ............... | E04C 3/005 |
| | | | | 52/108 |
| 2016/0068281 A1* | 3/2016 | Baudasse | ............... | F16M 11/38 |
| | | | | 244/172.6 |
| 2017/0058524 A1* | 3/2017 | Fernandez | ............. | E04C 3/005 |

OTHER PUBLICATIONS

"CORIN® XLS Polyimide", Retrieved from the Internet: URL:http://www.nexolvematerials.com/low-cure-polyimides/corin-xls-polyimide; 2 pgs.

Passaretti et al., "Development of a Solar Array Drive Assembly for CubeSat," *Proceedings of the 40th Aerospace Mechanisms Symposium*, NASA Kennedy Space Center, May 12, 2010; 445-53.

"Small Satellite Solar Panels: High Efficiency Solar Arrays for All Types Small Satellites and CubeSats," Clyde Space, 2012; 2 pgs.

"Small Spacecraft in Deep Space: Power, Navigation, and Structures," *NASA SBIR 2015 Phase I Solicitation; Sub Topic: Z4.01*, pp. 6-8.

"Sunmill™ Array." Tethers Unlimited. Retrieved from the Internet:URL:http://www.tethers.com/SpecSheets/Brochure_SunMillArray.pdf; 1 pg.

\* cited by examiner

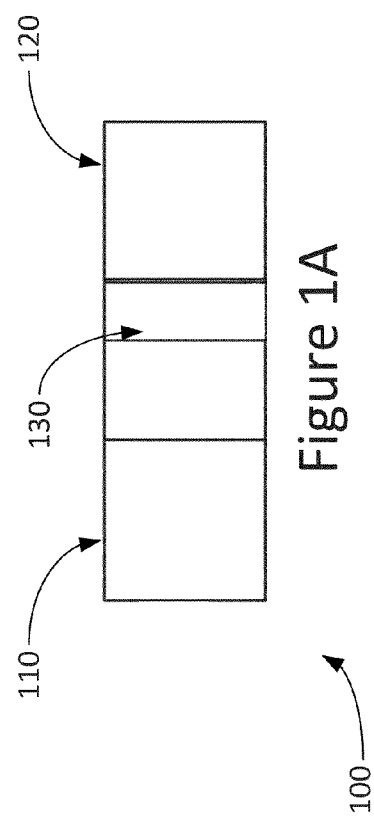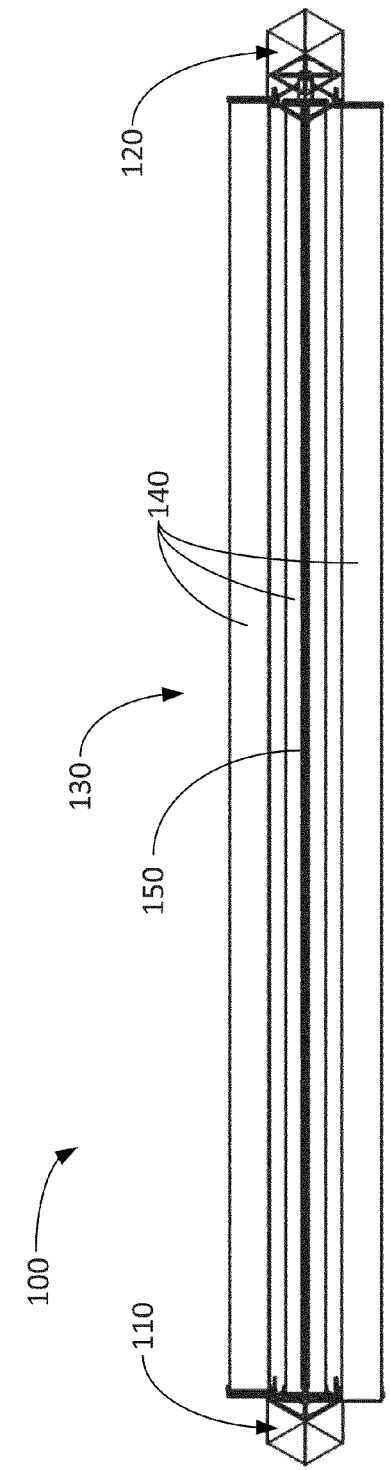
Figure 1A
Figure 1B

EXTENDABLE SOLAR ARRAY FOR A SPACECRAFT SYSTEM

CROSS-REFERENCE TO RELATED APPLICATIONS

This application claims the benefit of U.S. Provisional Patent Application Ser. No. 62/061,575 filed 8 Oct. 2014, entitled "EXTENDABLE SOLAR ARRAY," which is incorporated herein by reference in its entirety.

BACKGROUND

The present disclosure relates generally to solar arrays and systems for use with such solar arrays to provide solar power to spacecraft.

Generally, solar arrays for spacecraft may include aluminum or composite honeycomb structures with glass covers. Further, such solar arrays may also include crystalline, rigid photovoltaics and stiff or flexible deployment mechanisms/structures.

SUMMARY

The exemplary extendable solar arrays may be described as providing a simple, easy-to-integrate, light-weight, high-power, and robust means of solar power to a spacecraft. The extendable solar arrays may also distribute the mass of the spacecraft to provide passive attitude stabilization from gravity gradient forces.

One exemplary spacecraft system may include a first portion, a second portion, and a solar array apparatus. The first and second portions may be configured to store one or more electronic components. The solar array apparatus may include at least one solar array coupled to each of the first and second portions, and an extendable boom coupled to each of the first and second portions. The solar array apparatus may be configurable in at least a stowed configuration and a deployed configuration. The at least one solar array may extend between the first portion and the second portion to collect incident radiation when the solar array apparatus is in the deployed configuration and the extendable boom may extend between the first portion and the second portion when the solar array apparatus is in the stowed configuration and the deployed configuration. The first and second portions may be located closer to each other when the solar array apparatus is in the stowed configuration than when in the deployed configuration and the first and second portions may be located farther away from each other when the solar array apparatus is in the deployed configuration than when in the stowed configuration.

In one or more embodiments, the extendable boom may be biased to extend along a boom axis and extendable boom may be operable to configure the solar array apparatus from the stowed configuration to the deployed configuration. The extendable boom may be restricted from movement when the solar array apparatus is in the stowed configuration and the extendable boom may be released to extend along the boom axis to configure the solar array apparatus in the deployed configuration. In one or more embodiments, the solar array apparatus may also include a release mechanism. The release mechanism may restrict movement of the solar array apparatus when the solar array apparatus is in the stowed configuration and the release mechanism may release the restriction of the movement of the solar array apparatus such that the solar array apparatus is configurable in the deployed configuration.

In one or more embodiments, the solar array apparatus may biased to be configured in the deployed configuration and the solar array apparatus may also include a deployment actuator apparatus configured to restrict the at least one solar array from movement when the solar array apparatus is in the stowed configuration. The deployment actuator apparatus may also be configured to release the at least one solar array to configure the solar array apparatus in the deployed configuration. In one or more embodiments, the first portion, the solar array apparatus, and the second portion may be arranged along a spacecraft axis. A perpendicular axis may be perpendicular to the spacecraft axis. A first moment of inertia may be defined along the spacecraft axis and a second moment of inertia may be defined along the perpendicular axis. In one or more embodiments, the second moment of inertia may be greater than the first moment of inertia and may result in a passive attitude orientation from gravity gradient forces.

In one or more embodiments, the at least one solar array may extend along a solar array axis and may define a solar array width, extending perpendicular to the solar array axis, that is greater than a width of the first and second portion, extending perpendicular to the solar array axis, when the solar array apparatus is in the deployed configuration. In one or more embodiments, the at least one solar array may include thin-film photovoltaics. In one or more embodiments, the at least one solar array may be rolled up when the solar array apparatus is in the stowed configuration and the at least one solar array may be unrolled when the solar array apparatus is in the deployed configuration.

Another exemplary spacecraft system may include a spacecraft system including a storage portion, a first solar array apparatus, and a second solar array apparatus. The storage portion may define an interior space and may be configured to be coupled to one or more payload portions configured to store one or more electronic components. Each of the first solar array apparatus and the second solar array apparatus may include at least one solar array coupled to the storage portion and an extendable boom coupled to the storage portion and couplable to the at least one solar array. The first and second solar array apparatus may be configurable in at least a stowed configuration and a deployed configuration. The at least one solar array of the first and second solar array apparatus may be extended away from the storage portion outside of the interior space of the storage portion to collect incident radiation when the first and second solar array apparatus are in the deployed configuration. The first and second solar array apparatus may be stored within the interior space of the storage portion when the first and second solar array apparatus are in the stowed configuration. In one or more embodiments, the extendable booms of the first and second solar array apparatus may provide support to the at least one solar arrays of the first and second solar array apparatus when the first and second solar array apparatus are in the deployed configuration.

In one or more embodiments, the extendable boom of the first and second solar array apparatus may be biased to extend along a boom axis and may be operable to configure the first and second solar array apparatus from the stowed configuration to the deployed configuration. The extendable boom may be restricted from movement when the first and second solar array apparatus is in the stowed configuration and the extendable boom may be released to extend along the corresponding boom axis to configure the first and second solar array apparatus in the deployed configuration.

In one or more embodiments, the extendable boom may include a web portion, a first flange portion extending from the web portion, a second flange portion extending from the web portion opposite the first flange portion, a third flange portion extending from the web portion, and a fourth flange portion extending from the web portion opposite the third flange portion. In one or more embodiments, the first flange portion, the second flange portion, and the web portion may define a first concave surface and the third flange portion, the fourth flange portion, and the web portion may define a second concave surface facing opposite the first concave surface when the first and second solar array apparatus are in the deployed configuration. In one or more embodiments, each of the first and second solar array apparatus may also include a release mechanism. The release mechanism may restrict movement of the first and second solar array apparatus when the first and second solar array apparatus are in the stowed configuration and the release mechanism may release the restriction of the movement of the first and second solar array apparatus such that the first and second solar array apparatus are configurable in the deployed configuration.

In one or more embodiments, the first and second solar array apparatus may be located entirely within the interior space of the storage portion when the first and second solar array apparatus are in the stowed configuration. In one or more embodiments, the storage portion may include 2U of a CubeSat.

Yet another exemplary spacecraft system may include a spacecraft system including a storage portion and a solar array apparatus. The storage portion may define an interior space and may be configured to be coupled to one or more payload portions configured to store one or more electronic components. The solar array apparatus may include at least one solar array coupled to the storage portion and an extendable boom coupled to the storage portion and couplable to the at least one solar array. The extendable boom may be biased to extend along a boom axis and may include a web portion, a first flange portion extending from the web portion, a second flange portion extending from the web portion opposite the first flange portion, a third flange portion extending from the web portion, and a fourth flange portion extending from the web portion opposite the third flange portion. In one or more embodiments, the first flange portion, the second flange portion, and the web portion may define a first concave surface and the third flange portion, the fourth flange portion, and the web portion may define a second concave surface facing opposite the first concave surface when the solar array apparatus is in the deployed configuration. The solar array apparatus may be configurable in at least a stowed configuration and a deployed configuration. The at least one solar array of the solar array apparatus may be extended away from the storage portion outside of the interior space of the storage portion to collect incident radiation when the solar array apparatus is in the deployed configuration and the solar array apparatus may be stored within the interior space of the storage portion when the solar array apparatus is in the stowed configuration. In one or more embodiments, the extendable boom may provide support to the at least one solar array and may be operable to configure the at least one solar array to extend away from the storage portion when the solar array apparatus moves from the stowed configuration to the deployed configuration.

In one or more embodiments, the extendable boom may be configurable in at least a normal, linear configuration and a nonlinear configuration. The first flange portion, second flange portion, and web portion may extend along the boom axis when in the normal, linear configuration and may extend nonlinearly when in the nonlinear configuration. In one or more embodiments, the extendable boom may be symmetric about at least one symmetry axis perpendicular to the boom axis when in a normal, linear configuration. In one or more embodiments, the extendable boom may be symmetric about at least two symmetry axes, each of the at least two symmetry axes perpendicular to the boom axis when in a normal, linear configuration.

In one or more embodiments, the solar array apparatus may also include a release mechanism. The release mechanism may restrict movement of the solar array apparatus when the solar array apparatus is in the stowed configuration and the release mechanism may release the restriction of the movement of the solar array apparatus such that the solar array apparatus is configurable in the deployed configuration. In one or more embodiments, the solar array apparatus may be located entirely within the interior space of the storage portion when the solar array apparatus is in the stowed configuration.

The above summary is not intended to describe each embodiment or every implementation of the present disclosure. A more complete understanding will become apparent and appreciated by referring to the following detailed description and claims taken in conjunction with the accompanying drawings.

BRIEF DESCRIPTION OF THE DRAWINGS

FIG. 1A is a side view of an exemplary spacecraft system when a solar array apparatus in a stowed configuration.

FIG. 1B is a perspective view of the exemplary spacecraft system of FIG. 1A when the solar array apparatus is in a deployed configuration.

DETAILED DESCRIPTION OF EXEMPLARY EMBODIMENTS

Figure 2:
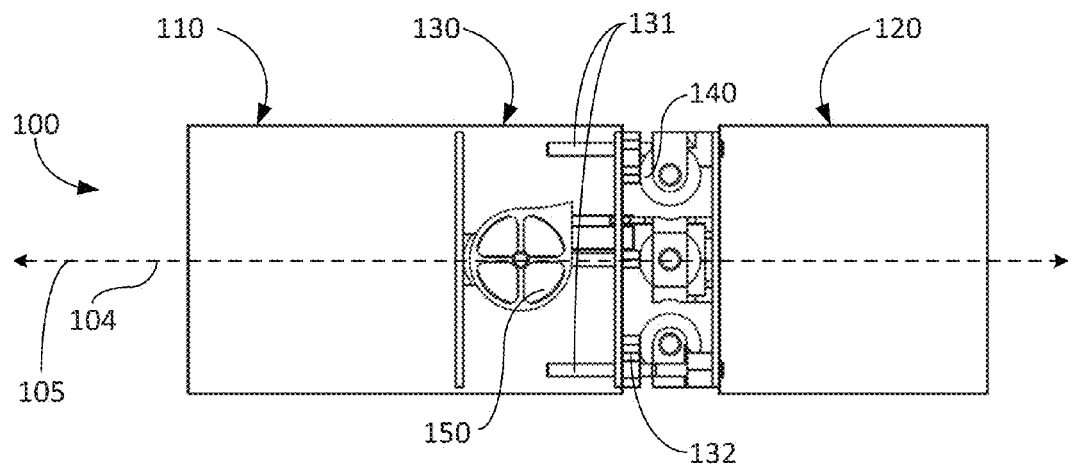
FIG. 2 is a side view of a first portion, a second portion, and a solar array apparatus of the exemplary spacecraft system of FIG. 4A when the solar array apparatus is in the stowed configuration.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary embodiments shall be described with reference to FIGS. 1-15. It will be apparent to one skilled in the art that elements (e.g., apparatus, structures, parts, portions, regions, configurations, functionalities, method steps, materials, etc.) from one embodiment may be used in combination with elements of the other embodiments, and that the possible embodiments of such apparatus and systems using combinations of features set forth herein is not limited to the specific embodiments shown in the figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others.

Exemplary systems for extendable solar arrays are described herein. One exemplary spacecraft system may include a solar array that is coupled, on two opposing ends, to at least two spacecraft portions. Another exemplary spacecraft system may include a solar array that is coupled to a spacecraft portion and extending therefrom. The spacecraft portions may be many different shapes and sizes. For example, the spacecraft portions may include 1U/2U/3U/6U/12U/24U CubeSats, other small satellites, and even larger satellites. In one or more embodiments, the spacecraft portions may include only a portion (e.g., a 1U/2U/3U/6U/12U/24U sized portion) of a spacecraft (e.g., a 1U/3U/6U/12U/24U CubeSat). Further, the extendable solar array system may be usable or scalable, from a CubeSat to much larger versions for larger spacecraft. Additionally, the solar array may be stored within an interior space of the spacecraft portions when in a stowed configuration and may extend from the spacecraft portions when in a deployed configuration. In other words, the exterior form factor of the spacecraft portions may remain the same when the solar array is stowed (e.g., even though the spacecraft system includes at least one solar array). This arrangement may allow for better packing efficiency by utilizing the space within the spacecraft portions.

An exemplary spacecraft system 100 including a first portion 110, a second portion 120, and a solar array apparatus 130 between the first portion 110 and the second portion 120 is shown in FIGS. 1A-1B. It is to be understood that the first portion 110, second portion 120, and solar array apparatus 130 depicted in FIGS. 2-11 do not depict walls and instead the walls are transparent to better depict the features of the spacecraft system 100. However, it is to be understood that the first portion 110, second portion 120, and the solar array apparatus 130 include exterior walls that define a, e.g., cavity, interior space, area where the internal contents of the spacecraft system are held. The solar array apparatus 130 may be configurable in at least a stowed configuration (see, e.g., FIG. 1A) and a deployed configuration (see, e.g., FIG. 1B). The solar array apparatus 130 may be contained, or located, within at least one of the first and second portions 110, 120 when the solar array apparatus 130 is in the stowed configuration. The solar array apparatus 130 may extend between the first and second portions 110, 120 when the solar array apparatus 130 is in the deployed configuration. It may also be described that the first and second portions 110, 120 may be located closer to each other when the solar array apparatus 130 is in the stowed configuration than when in the deployed configuration and the first and second portions 110, 120 may be located farther away from each other when the solar array apparatus 130 is in the deployed configuration than when in the stowed configuration.

Figure 4A:
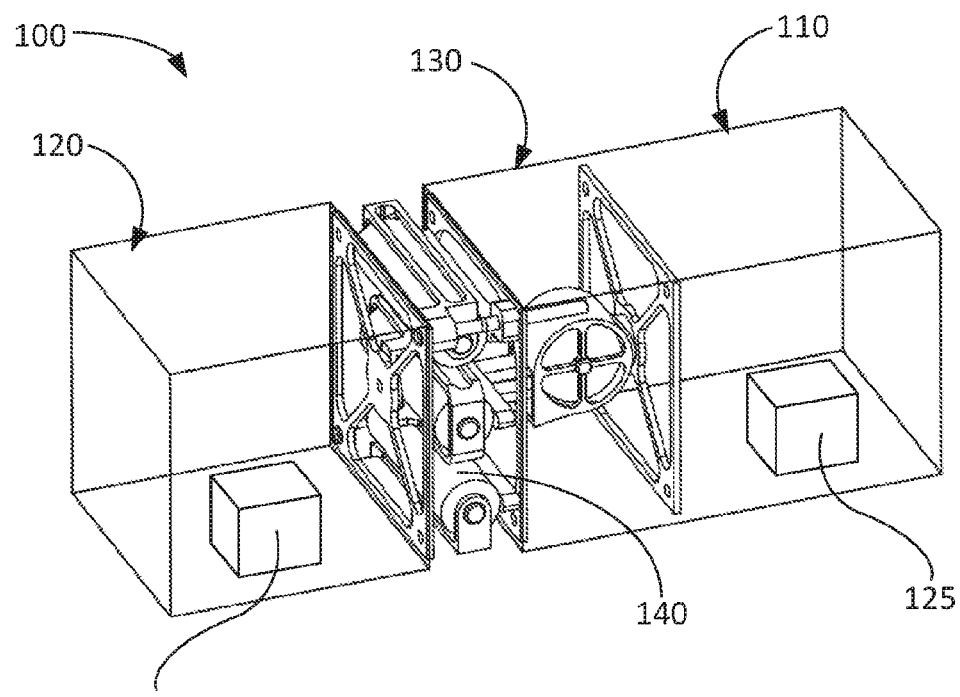
FIG. 4A is another perspective view of the first portion, the second portion, and the solar array apparatus of the exemplary spacecraft system of FIG. 1A when the solar array apparatus is between the stowed configuration and the deployed configuration.
Figure 4B:
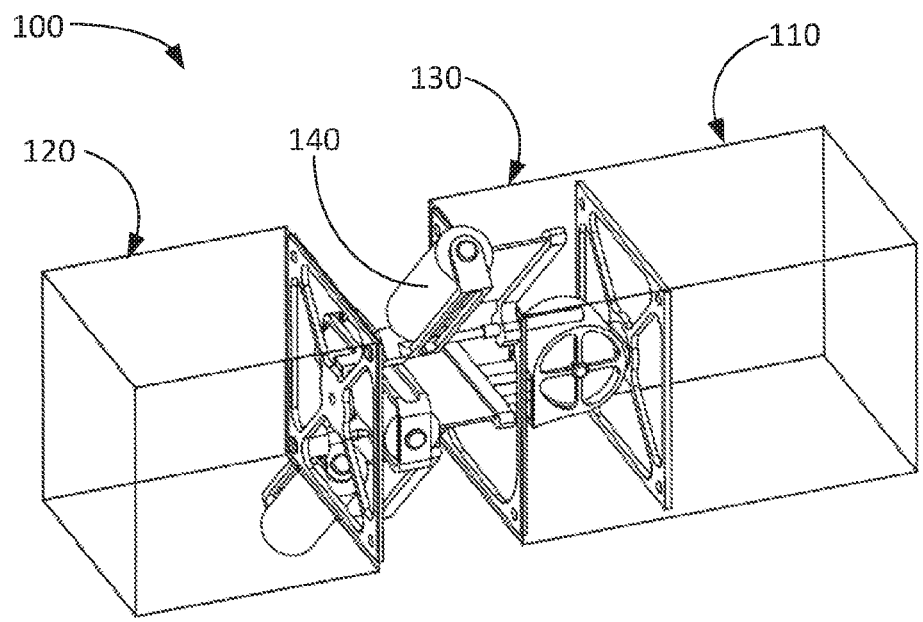
FIG. 4B is a perspective view of the exemplary spacecraft system of FIG. 1A with at least one solar array of the solar array apparatus extended away from the first and second portion.

The first and second portions 110, 120 may include one or more payload portions configured to store one or more electronic components 125 (e.g., as shown as a schematic depiction in FIG. 4A). In other words, the first and second portions 110, 120 may each include one or more electronic components 125 even though the first and second portions 110, 120 may be separated by the solar array apparatus 130 and may be extended away from each other when the solar array apparatus 130 is in the deployed configuration. In one or more embodiments, the one or more electronic components 125 may include, e.g., a communication system, command & control computer, electrical power processing system, scientific instruments, etc. In one or more embodiments, a first portion 110 may be larger than a second portion 120. A plane between the first and second portions 110, 120 may be referred to as a separation plane. The solar array apparatus 130 may be initially positioned within one or both of the first and second portions 110, 120 or another portion.

The solar array apparatus 130 (e.g., when in a deployed configuration) may also configure the spacecraft system 100 into a shape that distributes the mass of the spacecraft system 100 in a geometry that may provide passive attitude stabilization from gravity gradient forces, e.g., from the Earth, Moon, Mars, or any other planetary body. In one or more embodiments, the spacecraft system 100 may provide power levels in excess of the state of the art for CubeSats or similar satellites and may also provide a two degree of freedom attitude stabilization with gravity gradient torques. The increased power level potential and two degree of freedom attitude control may be helpful in performing various satellite missions. Additionally, the two degree of freedom attitude control may provide for a nadir-pointing spacecraft system 100 in orbit about a planetary body.

Further, the separation of the first and second portions 110, 120 of the spacecraft system 100 into two masses on either end of the solar array apparatus 130 when the solar array apparatus 130 is in the deployed configuration may create gravity gradient forces that provide a torque on the spacecraft. The torque on the spacecraft may be in the direction that would cause an axis of minimum moment of inertia to point to the center of the spacecraft orbit. It may be described that, when the solar array apparatus 130 is in the deployed configuration, the spacecraft system 100 may separate into major mass fractions, in the form of spacecraft portions (e.g., first and second portions 110, 120), by an appreciable distance. The presence of the at least one solar array 140 between the first and second portions 110, 120 may create a "long aspect ratio" that enables the gravity gradient. For example, when the system initially deploys and gravity gradient torque is generated, the gravity gradient torque may cause the spacecraft system 100 to rotate in the direction that would align the axis of minimum moment of inertia with a line from the center of mass of the spacecraft system 100 to the focus of the spacecraft's orbit (e.g. the center of Earth of other body). The presence of some form of damping of this motion may help, or assist, the rotation from overshooting alignment of these two axes and may prevent the spacecraft system 100 from oscillating back and forth about the stable point when the axes are aligned.

In one or more embodiments, a subsystem of the spacecraft system 100 may supply the damping necessary to stabilize attitude oscillations at the start of gravity stabilization. In one or more embodiments, hysteresis damping, e.g., magnetic damping, may be integrated directly or indirectly into the solar array apparatus 130 for damping the initial oscillation of the gravity gradient torque. The damping may reduce the magnitude of the oscillations to a level that establishes the required pointing accuracy for the execution of the spacecraft's mission. The damping may be passive or may be actively controlled by, for example, an electromagnet.

When the solar array apparatus 130 is in the stowed configuration, the solar array apparatus 130 may be contained within a sub-volume that is within a volume (e.g., an interior space) defined by an outer surface of the spacecraft portion (e.g., first portion 110, second portion 120, storage portion, etc.) or bus, e.g., a CubeSat bus. The solar array apparatus 130 may be intended to be stowed during launch of the spacecraft system 100 and during initial orbit insertion. In one or more embodiments, the solar array apparatus 130 may be constrained by a main body of the spacecraft portions during launch. An automated or a user-initiated command may cause the spacecraft system 100 to separate about a separation plane (e.g., between the spacecraft portions) of the spacecraft system 100 and the at least one solar array 140 may extend therefrom.

The solar array apparatus 130 may include at least one solar array 140 coupled to each of the first and second portions 110, 120. It may be described that, the at least one solar array 140 may include one or more photovoltaic spool assemblies, each including a solar array 140. When the solar array apparatus 130 is in the deployed configuration, the at least one solar array 140 may extend between the first and second portions 110, 120 to collect incident radiation. Solar electromagnetic radiation incident on the at least one solar array 140 may be converted into electrical energy to be used by the spacecraft system 100. The power generated by the solar array apparatus 130 may interface with a power system of the spacecraft system 100 or with a power system module that may be integrated into the solar array apparatus 130. The solar array apparatus 130 may be described as providing a simple, easy-to-integrate, light-weight, high-power, and robust source of solar power to a spacecraft system 100.

In one or more embodiments, the at least one solar array 140 may include a flexible or a semi-rigid material. Further, the at least one solar array 140 may include flexible, thin-film photovoltaic solar modules, crystalline photovoltaic solar modules, or a combination of both. In some embodiments, the at least one solar array 140 may include multiple solar arrays or photovoltaic spool assemblies. The thin-film photovoltaic material may include one or more of copper indium gallium selenide, cadmium telluride, inverted metamorphic multijunction, organic photovoltaic, etc.

In one or more embodiments, the at least one solar array 140 may be described as having a high packaging efficiency with a thin-film roll-out design. The at least one solar array 140 may also integrate a photovoltaic substrate, an absorption layer, a support structure, an electrical connection, and encapsulation material (e.g., the encapsulation material may be a replacement for cover glass) into a single thin, monolithic system that may be rolled up into a volume with high packaging efficiency. In one or more embodiments, the at least one solar array 140 may be described as using mechanisms/structures that include few uncomplicated parts, or portions, and that integrate thin-film photovoltaic cells 145 (e.g., as shown on a portion of the at least one solar array 140 of FIG. 6). The use of few, uncomplicated parts, or portions, in the mechanisms/structures and thin-film photovoltaic cells may be described as providing a spacecraft system 100 with a robust design.

The at least one solar array 140 may include one rolled section, multiple rolled sections, folded sections or both rolled and folded sections. In some embodiments, the folded sections may be arranged like a stacked "accordion." The at least one solar array 140 may extend from the storage portion (e.g., between the first portion 110 and the second portion 120) by rolling, unfolding, spinning or any other method to transition the at least one solar array 140 from a compressed state to an extended state. For example, the at least one solar array 140 may be rolled up when the solar array apparatus 130 is in the stowed configuration and the at least one solar array 140 may be unrolled when the solar array apparatus 130 is in the deployed configuration.

In one or more embodiments, the spacecraft system 100 may also include an extendable boom 150 (or longeron) that is coupled between each of the first and second portions 110, 120 as shown in FIG. 1B. In one or more embodiments, the extendable boom 150 may extend the at least one solar array 140 away from at least one portion (e.g., the first portion 110, the second portion 120, the storage portion, etc.) of the spacecraft system 100 to configure the solar array apparatus 130 in the deployed configuration. In other words, the extendable boom 150 may provide the functionality of extending the solar array apparatus in the deployed configuration. The at least one solar array 140 and the extendable boom 150 may be initially positioned in the same or different spacecraft portions (e.g., the first portion 110, the second portion 120) when the solar array apparatus 130 is in the stowed configuration.

In one or more embodiments, the solar array apparatus 130 may be biased to be configured in the deployed configuration but may be constrained in the stowed configuration until released. For example, the extendable boom 150 may be biased to extend (and, e.g., operable to configure) the solar array apparatus 130 from the stowed configuration to the deployed configuration. The extendable boom 150 may be restricted from movement when the solar array apparatus 130 is in the stowed configuration (e.g., the extendable boom 150 may be described as being at a high potential energy state when the solar array apparatus 130 is in the stowed configuration). When the extendable boom 150 is released (e.g., released from restriction), the extendable boom 150 may configure the solar array apparatus 130 in the deployed configuration (e.g., the extendable boom 150 may be described as being at a low potential energy state when the solar array apparatus 130 is in the deployed configuration). In other embodiments, the solar array apparatus may also include a motor operable to extend, move, or place the extendable boom 150 to configure the solar array apparatus 130 in the deployed configuration.

The extendable boom 150 may include (e.g., be formed of, be manufactured of, etc.) one or more metallic materials, composite materials, etc. In some embodiments, the extendable boom 150 may define various geometries including Triangular Rollable and Collapsible (TRAC), Storable Tubular Extendable Member (STEM), Collapsible Tubular Mast (CTM), or other rollable/extendable concepts, etc. One exemplary extendable boom 150 is described herein with respect to FIGS. 12A-12C. The extendable boom 150 may extend by, e.g., rolling, unfolding, spinning or any other method to transition the solar array apparatus 130 from the stowed configuration to the deployed configuration. For example, the extendable boom 150 may be, e.g., a rollable boom, and the roll axis of the boom may be parallel with a roll axis of the at least one solar array 140 and provide rigidity and structural stability if rollable. Also, the roll radius of an extendable boom 150 that is rollable may be the same or different than a roll radius of the at least one solar array 140. When the solar array apparatus 130 is in the deployed configuration, the cross-sectional area of the deployed extendable boom 150 and associated moment of inertia may provide stiffness to the structure of the spacecraft system 100.

In one or more embodiments, the solar array apparatus 130 may include a release mechanism 132 (e.g., deployment mechanism) as shown in FIG. 2. In one or more embodiments, the release mechanism 132 may release the solar array apparatus 130 "on command," which may be automatic or user-generated. The release mechanism 132 may restrict movement of the solar array apparatus 130 when the solar array apparatus 130 is in the stowed configuration and may be released to allow the solar array apparatus 130 to configure when the solar array apparatus 130 in the deployed configuration. In one or more embodiments, the release mechanism 132 may release strain energy stored in the extendable boom 150 that, when released, extends the solar array apparatus 130 in the deployed configuration. In one or more embodiments, the release mechanism 132 may also use strain energy stored in a separate spring. In other embodiments, the release mechanism 132 may be driven by a separate motor. In one or more embodiments, the release mechanism 132 may be initiated by a shape memory actuator, burn wire, solenoid, paraffin actuator, etc.

Figure 3:
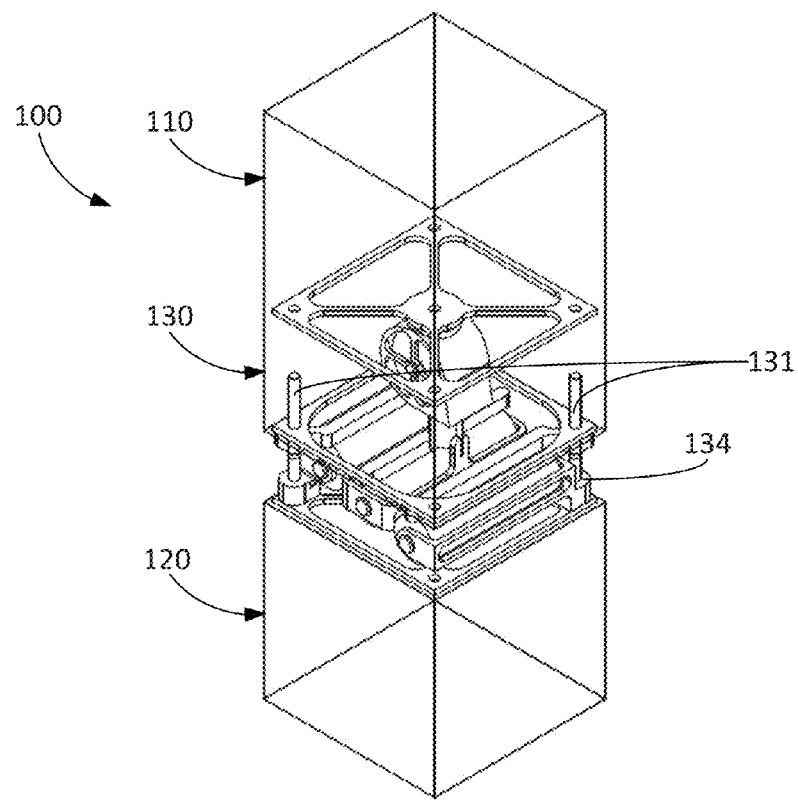
FIG. 3 is a perspective view of the first portion, the second portion, and the solar array apparatus of the exemplary spacecraft system of FIG. 1A when the solar array apparatus is between the stowed configuration and the deployed configuration.

In one or more embodiments, the solar array apparatus 130 may also include a deployment actuator 134, as shown in FIG. 3, that configures the at least one solar array 140 before or during deployment of the solar array apparatus 130 in the deployment configuration. The deployment actuator 134 may configure the at least one solar array 140 by rotation, swivel, linear motion, linear extension, unfolding, with energy provided by stored strain energy (e.g., springs), or by a combination of these. In one or more embodiments, the deployment actuator 134 may configure the at least one solar array 140 using, for example, a spring or a motor. In one or more embodiments, the deployment actuator 134 may be configured to restrict the at least one solar array 140 from movement when the solar array apparatus 130 is configured in the stowed configuration and the deployment actuator 134 may be configured to release the at least one solar array 140 to configure the solar array apparatus 130 in the deployed configuration.

Figure 5C:
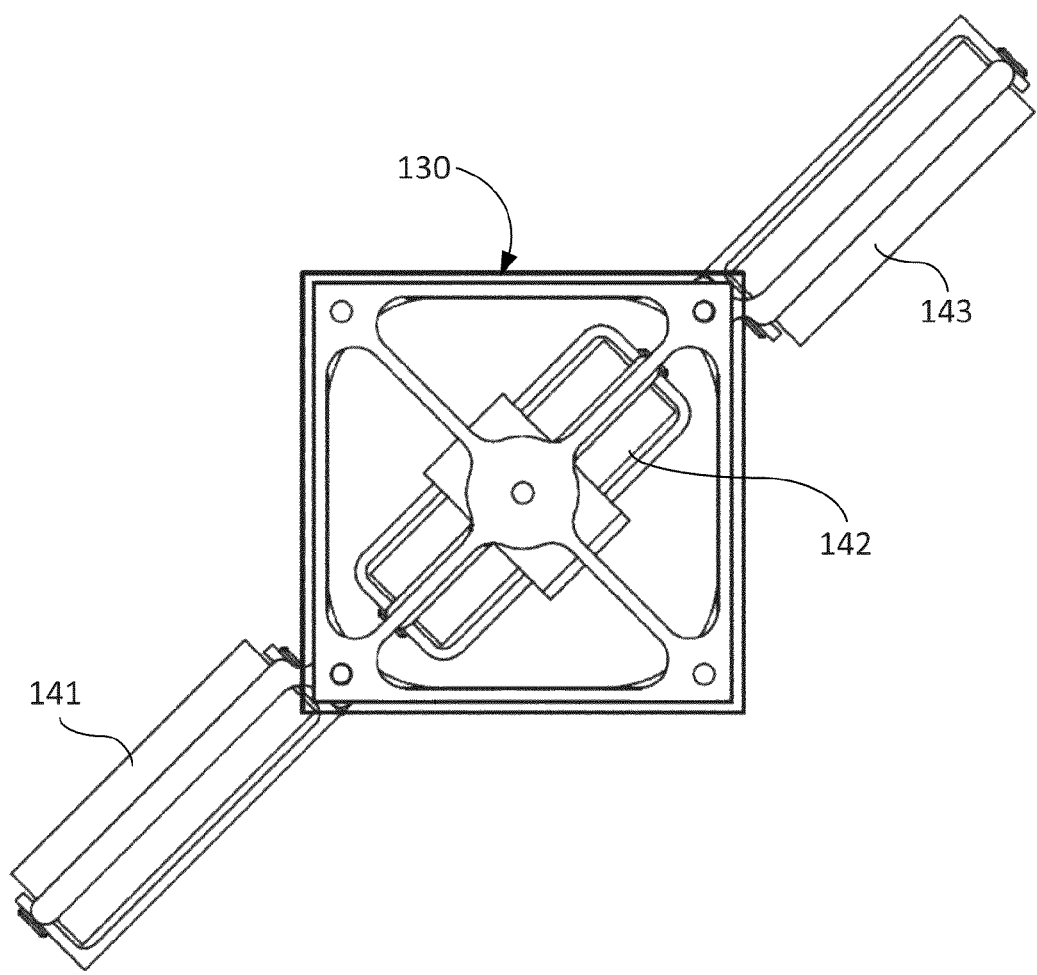
FIG. 5C is a top view of the exemplary solar array apparatus of FIG. 1A with at least one solar array extended.
Figure 6:
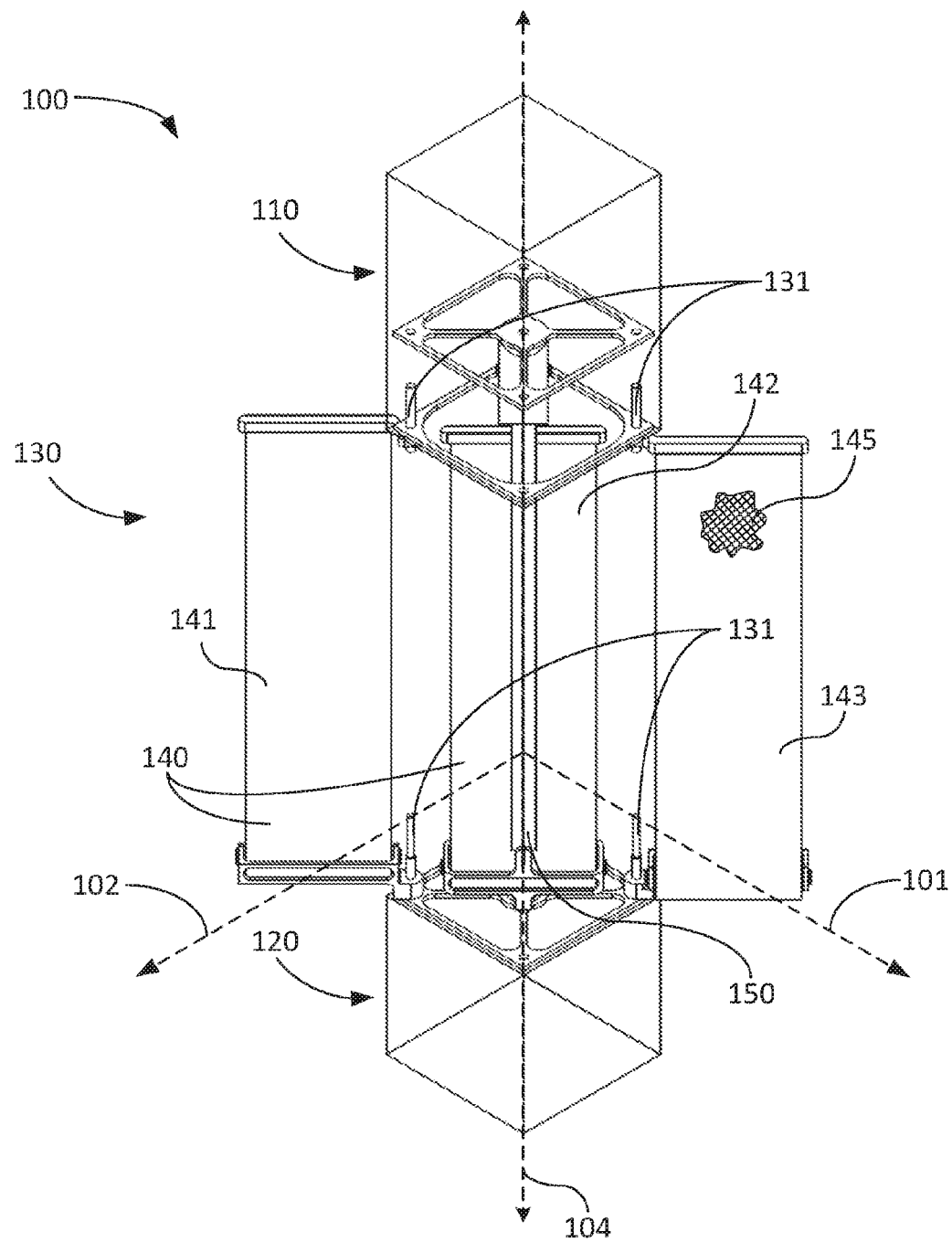
FIG. 6 is a perspective view of the exemplary spacecraft system of FIG. 1A when the solar array apparatus is in a partially deployed configuration.
Figure 7:
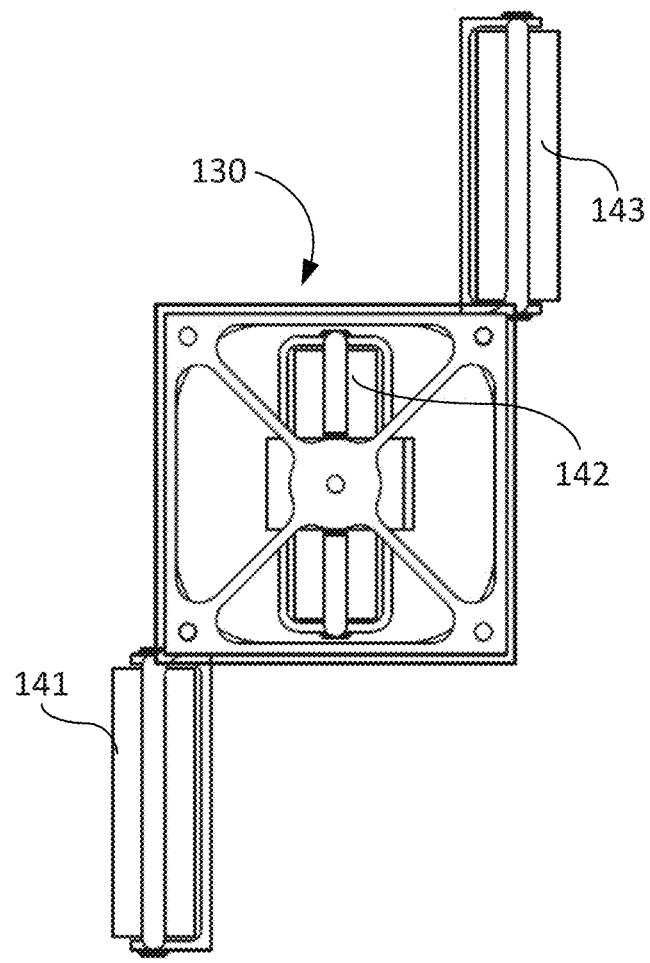
FIG. 7 is the exemplary solar array apparatus of FIG. 1A with at least one solar array of the solar array apparatus extended in a different configuration than FIG. 5C.
Figure 8:
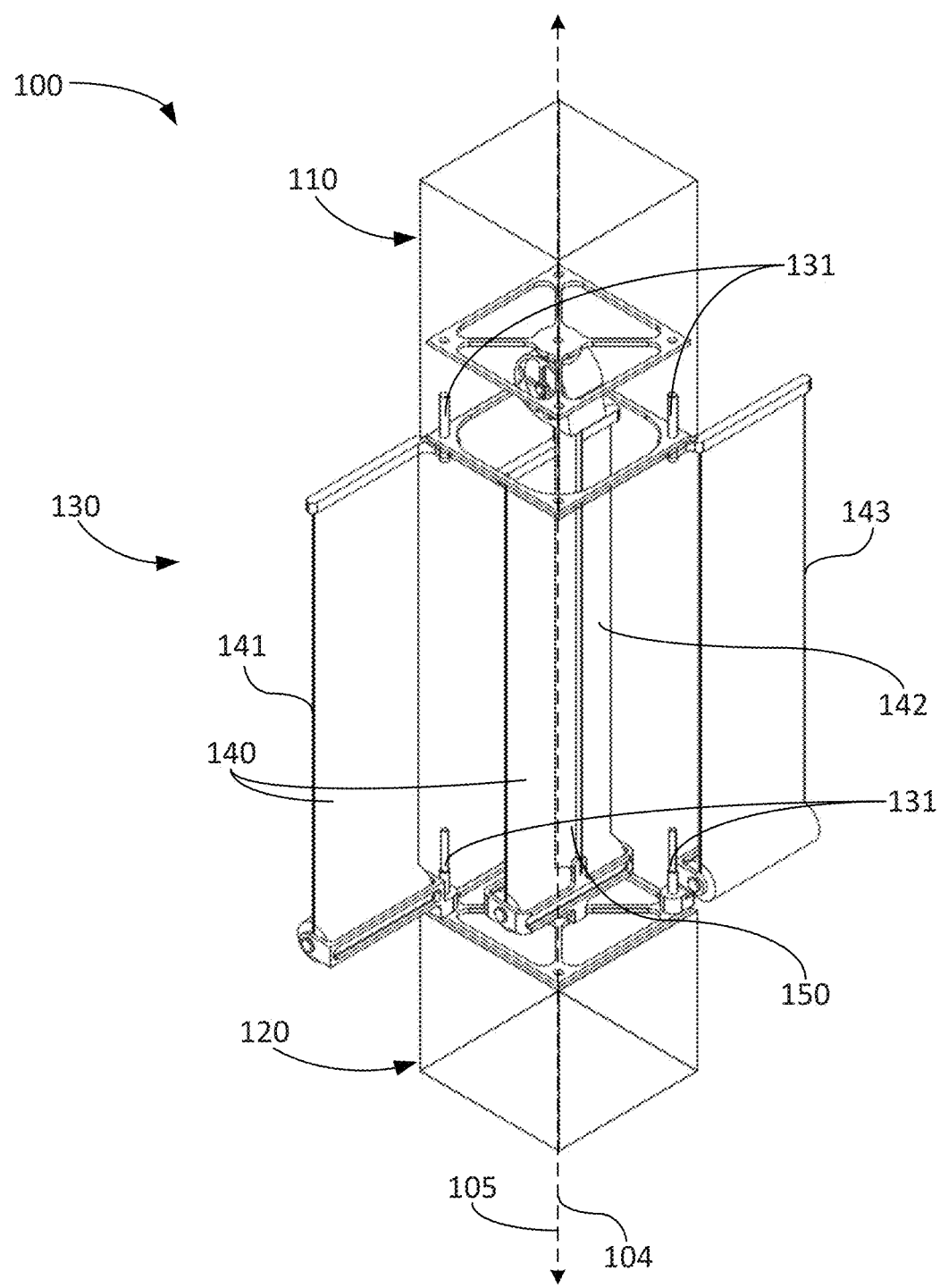
FIG. 8 is a perspective view of the exemplary spacecraft system of FIG. 7 when the solar array apparatus is in a partially deployed configuration.

After the deployment actuator 134 configures the at least one solar array 140 into position or in a deployed configuration plane, the at least one solar array 140 may be extended when the solar array apparatus 130 is to be configured in the deployed configuration. The deployment actuator 134 may arrange the at least one solar array 140 in a variety of different alignments. For example, the deployment actuator 134 may be configured to align two or more solar arrays in a single plane when the solar array apparatus 130 is in the deployed configuration as shown in FIGS. 5C & 6. Further, for example, the deployment actuator 134 may be configured to position two or more solar arrays into multiple parallel planes when the solar array apparatus 130 is in the deployed configuration as shown in FIGS. 7-8. Still further, for example, the deployment actuator 134 may be configured to position two or more solar arrays into multiple non-parallel planes when the solar array apparatus 130 is in the deployed configuration. In one or more embodiments, the deployment actuator 134 may configure the at least one solar array 140 into a position such that the at least one solar array 140 spreads beyond the width of the spacecraft portions when in the deployed configuration as shown in FIGS. 6-9 & 11. In other embodiments, the at least one solar array 140 may have a width that is less than the width of the first and second portions 110, 120 of the spacecraft system 100 when the solar array apparatus 130 is in the deployed configuration as shown in FIG. 10.

The solar array apparatus 130 may be configured in the deployed configuration through an active deployment system or a passive deployment system. Further, the solar array apparatus 130 may use both an active deployment system and a passive deployment system. The active deployment system may include a motor or some other applied force that extends the at least one solar array 140 (e.g., between the first and second portions 110, 120 until the solar array apparatus 130 is in the deployed configuration). The active deployment system may stop operating once the solar array apparatus 130 is in the deployed configuration. In one or more embodiments, the active deployment system may include an electromagnetic, chemical, physical, motor, or spring system. The passive deployment system may include a release mechanism 132 that is triggered to release the solar array apparatus 130, which then extends from the spacecraft portions (e.g., first and second portions 110, 120) due to stored energy to the deployed configuration. In one or more embodiments, the passive deployment system may include thermally-activated actuation embedded in the at least one solar array 140.

In one or more embodiments, the transition of the solar array apparatus 130 from the stowed configuration to the deployed configuration may include multiple stages. The solar array apparatus 130 may first release at least a portion of the solar array apparatus 130 from the stowed configuration into an initial separation configuration as shown in FIGS. 2, 3, & 4A. In other words, the first and second portions 110, 120 may separate at least partially to expose the at least one solar array 140. The first stage of initial separation may be driven by spring-preloaded separation-plane pins or with stored strain energy. Then, the at least one solar array 140 may be configured or released into a second separation configuration before the at least one solar array 140 is extended along the spacecraft axis 104 to configure the solar array apparatus 130 in the deployed configuration as shown in FIGS. 4B, 5B, 5C, & 7. For example, the at least one solar array may shift or rotate into a predetermined position before extending from the spacecraft portions (e.g., the first portion 110, second portion 120) when the solar array apparatus 130 is configured in the deployed configuration. Next, the at least one solar array 140 may extend to configure the solar array apparatus 130 in the deployed configuration as shown in FIGS. 6 & 8-11. The solar array apparatus 130 may include linear guides 131 that act as a physical connection between the first and second portions 110, 120 at the separation plane. In one or more embodiments, the linear guides 131 may be spring preloaded to provide energy for the initial separation or to begin the extension of the solar array apparatus 130 to the deployed configuration.

Figure 5A:
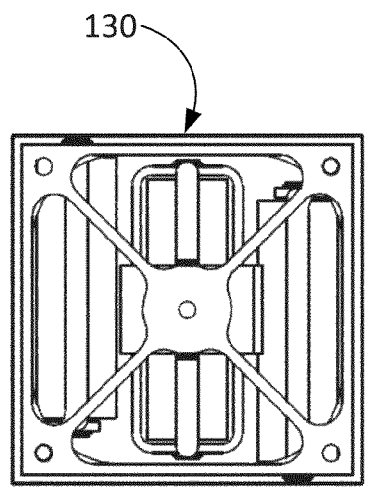
FIG. 5A is a top view of the solar array apparatus of FIG. 4A.
Figure 5B:
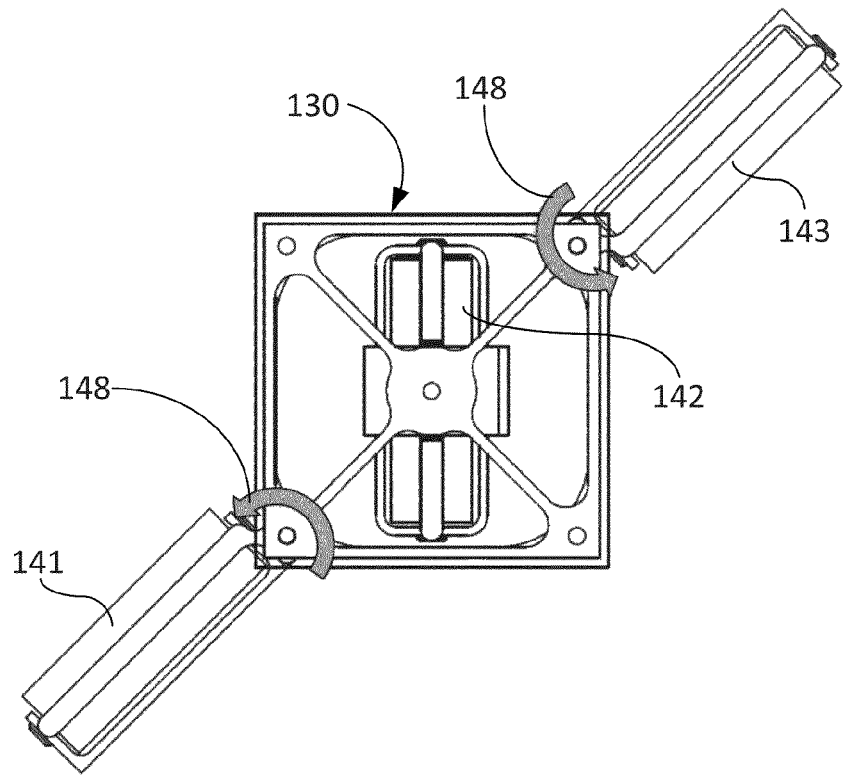
FIG. 5B is a top view of the solar array apparatus of FIG. 4B.

FIG. 5A illustrates the solar array apparatus 130 including a plurality of solar arrays 140 adjacent to one another when the solar array apparatus 130 is in the stowed configuration. The solar arrays may be positioned independently, together, or a combination of both. In FIG. 5B, a first solar array 141 and a third solar array 143 are rotated 148 out into a predetermined position from which the solar array apparatus 130 may be configured to the deployed configuration. In one or more embodiments, it may be described that an extendable boom cartridge rotates at least one of the photovoltaic spool assemblies of the solar arrays. The second solar array 142 may also be rotated into position as shown in FIG. 5C. The second solar array 142 may be rotated at the same time as the first and third solar array 141, 143 or at different times. Additionally, in one or more embodiments, the solar arrays may be staggered such that the first and third solar arrays 141, 143 may either rotate into position, as shown in FIGS. 5B-5C, or slide laterally out along an axis into position as shown in FIG. 7.

In one or more embodiments, the at least one solar array 140 may include a plurality of solar arrays. For example, the solar array apparatus 130 may include two solar arrays, three solar arrays, or a plurality of solar arrays. Specifically, the solar array apparatus 130 in FIG. 6 includes a first solar array 141, a second solar array 142, and a third solar array 143. Each of the first, second, and third solar arrays 141, 142, 143 extends from the first portion 110 to the second portion 120 and may be aligned such that each of the first, second, and third solar arrays 141, 142, 143 is in the same plane. Additionally, the first portion 110, the second portion 120, and the solar array apparatus 130 may be described as being arranged along a spacecraft axis 104 (e.g., solar array axis) as shown in FIGS. 2, 6, & 8-11. Similarly, the extendable boom 150 extends along a boom axis 105. As shown in FIG. 6, the spacecraft axis 104 may be equivalent to the boom axis 105. In one or more embodiments, the spacecraft axis 104 may not be the same as the boom axis 105.

In one or more embodiments, the arrangement of solar arrays in multiple non-parallel planes may be used in satellite configurations that do not have attitude (pointing) control about two axes such as described, but not shown, with respect to FIG. 6. These two axes, x-axis 101 and y-axis 102, are perpendicular to the spacecraft axis 104 (e.g., a z-axis) extending along the direction of the solar array completing a Cartesian coordinate frame. When the solar array apparatus 130 is configured in the deployed configuration, the apparatus may provide moments of inertia of the spacecraft system 100 about the x-axis 101 and y-axis 102 that are much greater than the moment of inertia about the z-axis (e.g., spacecraft axis 104), which may create a moment on the spacecraft system 100 from a gradient gravity force along the z-axis (e.g., spacecraft axis 104). This gravity gradient moment may provide a restorative moment to counter the external and internal attitude perturbations (e.g. rarified atmospheric drag, residual magnetic dipole, solar radiation pressure, moments produced by mechanisms internal to the spacecraft, etc.). This gravity gradient moment along with damping can be used to naturally orientate the spacecraft system 100 in a gravity gradient orientation that generally aligns the z-axis (e.g., spacecraft axis 104) toward the center of the Earth or other body that dominates the local gravitational field (e.g. the Sun, planets, moons, asteroids, etc.). In other words, a first moment of inertia is defined along the spacecraft axis 104, a second moment of inertia is defined along the second axis (e.g., x-axis 101 or y-axis 102), and the second moment of inertia is greater than the first moment of inertia. In at least another embodiment, the first moment of inertia is defined along the spacecraft axis 104, the second moment of inertia is defined along a second axis (e.g., x-axis 101 or y-axis 102), perpendicular to the spacecraft axis 104, and the first and second moments of inertia may result in a passive attitude orientation from gravity gradient forces.

In one or more embodiments, the at least one solar array 140 may be arranged such that each solar array of the at least one solar array 140 is in multiple parallel planes, e.g., as shown in FIGS. 7-8. Specifically, the first solar array 141 lies in a plane that is parallel to, but not the same as a plane that the second solar array 142 lies, and the third solar array 143 lies in a plane that is parallel to, but not the same as either of the planes the first and second solar array 141, 142 lie.

Figure 9:
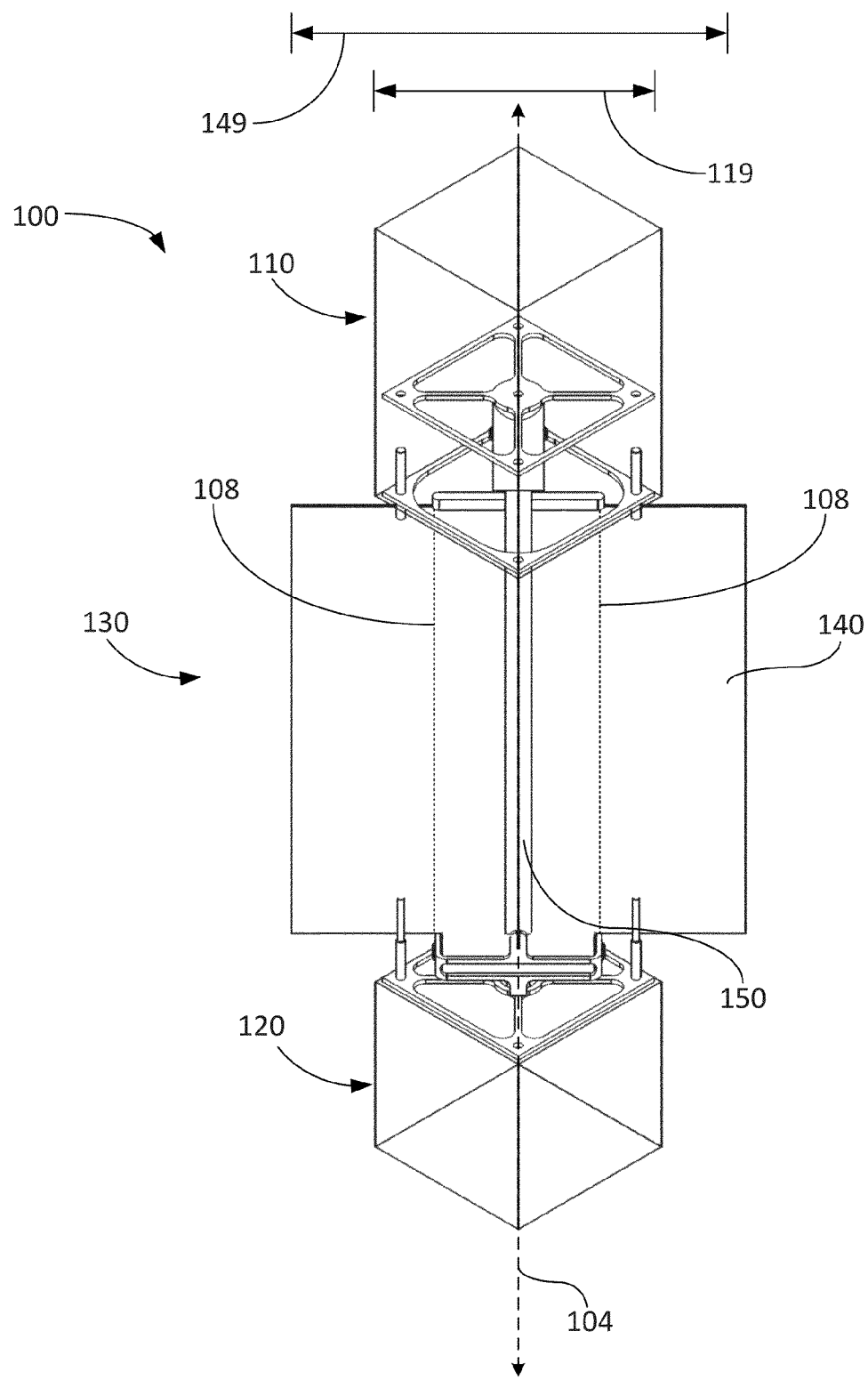
FIG. 9 is a perspective view of an exemplary spacecraft system including a solar array apparatus configured in a partially deployed configuration.
Figure 10:
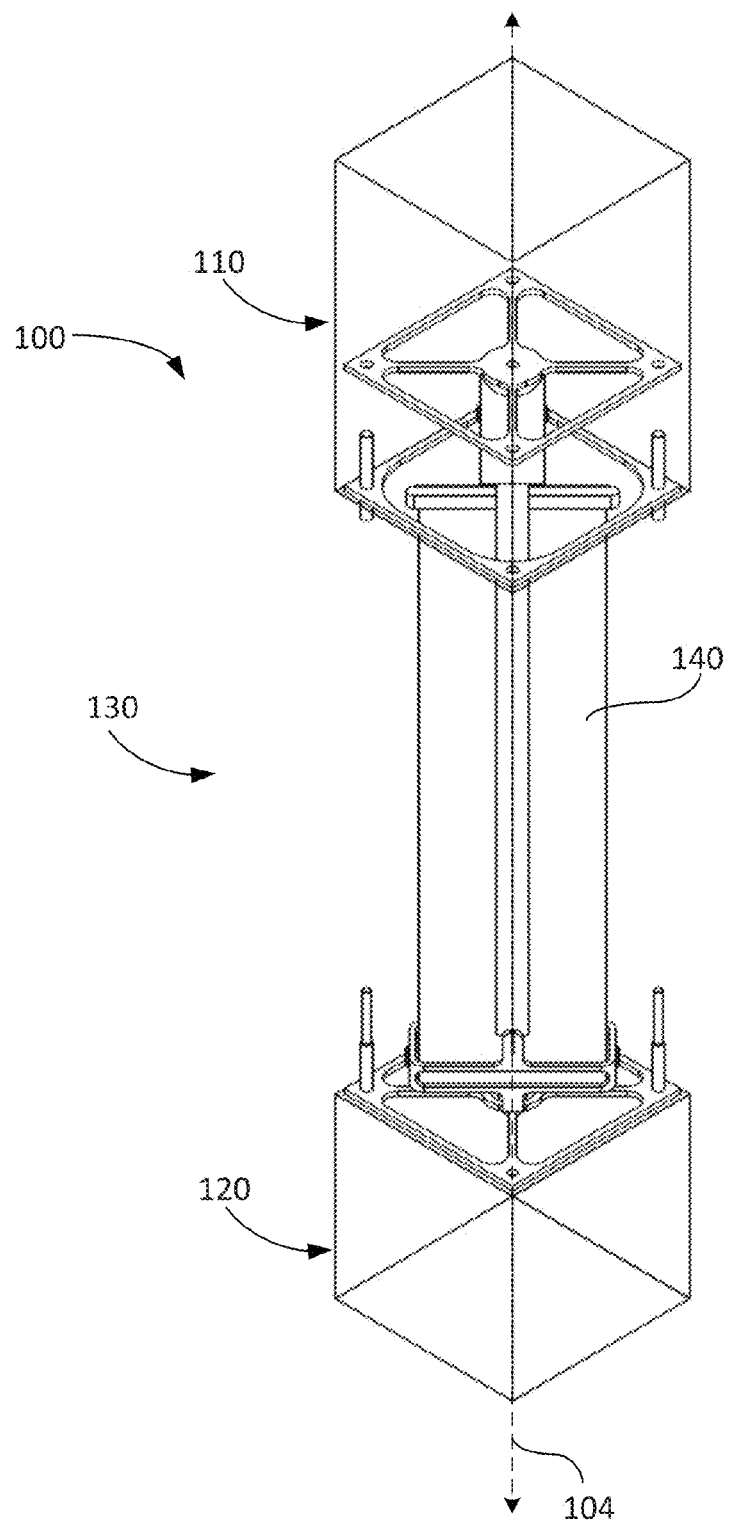
FIG. 10 is a perspective view of an exemplary spacecraft system including a solar array apparatus configured in a partially deployed configuration.

In one or more embodiments, the at least one solar array 140 may extend along the spacecraft axis 104 and unfold in a direction perpendicular to the spacecraft axis 104 when the solar array apparatus 130 is in the deployed configuration as shown in FIG. 9. The at least one solar array 140 may fold such that the at least one solar array 140 fits within the first and/or second portion 110, 120 when the solar array apparatus 130 is in the stowed configuration, but the at least one solar array 150 may expand to collect more incident radiation when the solar array apparatus 130 is in the deployed configuration. The at least one solar array 140 may unfold while the solar array apparatus 130 extends in the deployed configuration and/or after the solar array apparatus 130 is in the deployed configuration. The at least one solar array 140 may unfold by a spring loaded mechanism, a motor, or any other suitable way and may unfold along dotted lines 108 depicted in FIG. 9. In one or more embodiments, the at least one solar array 140 may be constrained from unfolding when the solar array apparatus 130 is extending in the deployed configuration and the unconstrained during or after the solar array apparatus 130 is extended in the deployed configuration. In one or more embodiments, the at least one solar array 140 may extend along the spacecraft axis 104 and the at least one solar array 104 may define a solar array width 149 in a direction perpendicular to the spacecraft axis 104 that is greater than a width 119 of the first and second portions 110, 120 in the direction perpendicular to the spacecraft axis 104 when the solar array apparatus 130 is in the deployed configuration. In one or more embodiments, the effective width (e.g., the combined width across all of the solar arrays) of the at least one solar array 140 may be greater than the width of the first and second portions 110, 120 in the direction perpendicular to the spacecraft axis 104 (see, e.g., FIG. 6). In one or more embodiments, the width of the at least one solar array 140 may be less than the width 119 of the first and second portions 110, 120 in the direction perpendicular to the spacecraft axis 104 (see, e.g., FIG. 10).

An exemplary solar array apparatus 130 including one solar array 140 extending between the first and second portions 110, 120 is illustrated in FIG. 10 that defines a width perpendicular to the spacecraft axis 104 that is less than a width of the first and second portions 110, 120.

Figure 11:
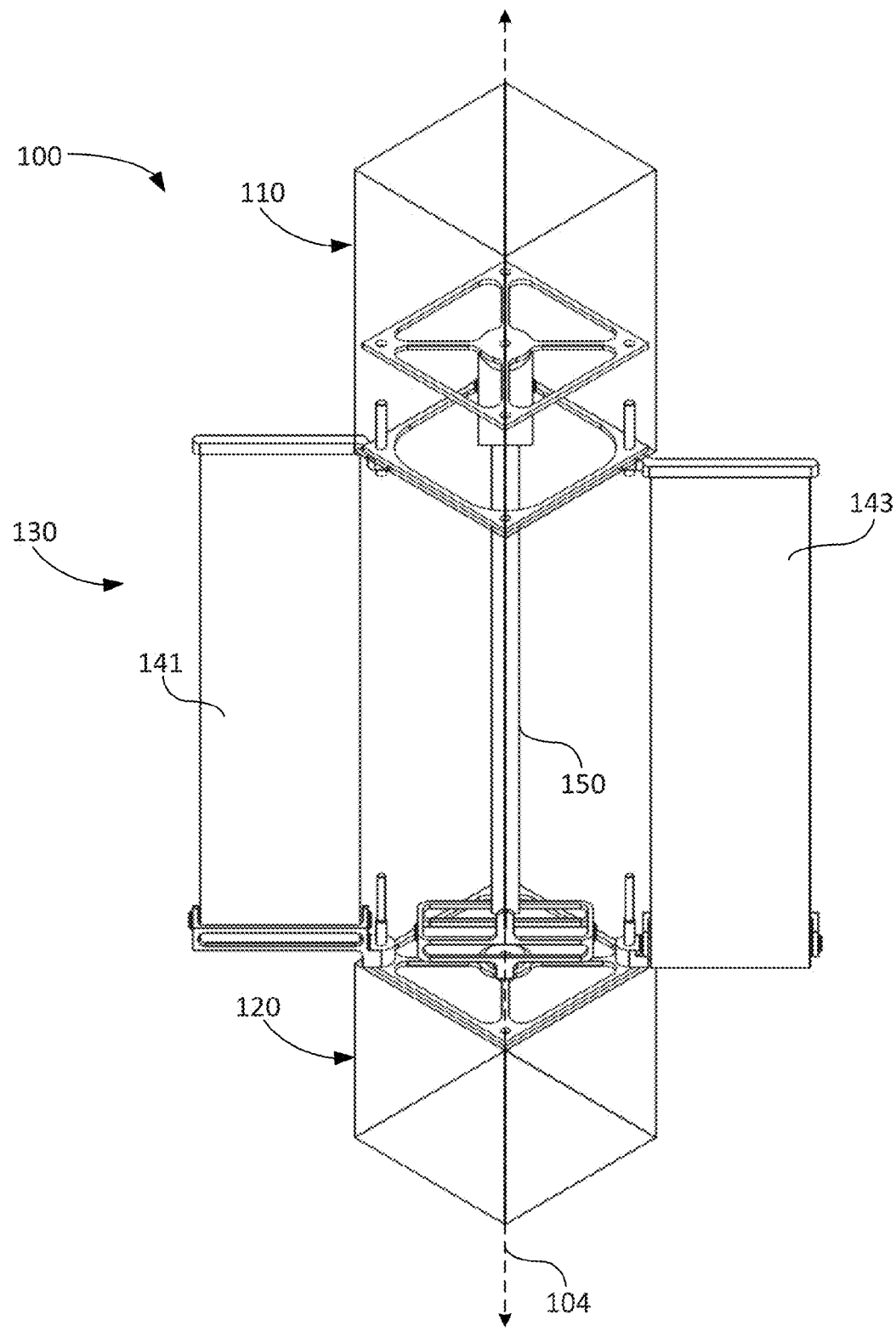
FIG. 11 is a perspective view of an exemplary spacecraft system including a solar array apparatus configured in a partially deployed configuration.

An exemplary solar array apparatus 130 including two solar arrays 141, 143 extending between the first and second portions 110, 120 is illustrated in FIG. 11. The solar arrays 141, 143 are located outside of the width 119 of the first and second portions 110, 120 defined perpendicular to the spacecraft axis 104. In other words, the space between the first and second portions 110, 120 and bounded by the width 119 of the first and second portions 110, 120 does not include a solar array. Further, in this embodiment, the extendable boom 150 extends from the first portion 110 to the second portion 120 to configure the solar array apparatus 130 in the deployed configuration in this region that does not include a solar array (e.g., as shown in FIG. 11).

Another exemplary spacecraft system 200 that includes a pair of solar array apparatus 220, 230 is shown in FIGS. 13A-15. The spacecraft system 200 may include a storage portion 210 that defines an interior space 211 and is configured to be coupled to one or more payload portions 215 configured to store one or more electronic components. The interior space 211 may be located within or inside walls defined by the storage portion 210 and the interior space 211 may also be defined as, e.g., a cavity, contained of the payload portion. It is to be understood that the storage portion 210 depicted in FIGS. 13A-15 does not depict walls and instead the walls are illustrated as transparent to better depict the features of the spacecraft system 200. However, it is to be understood that the storage portion includes exterior walls that define a, e.g., cavity, interior space 211, area where the internal contents of the spacecraft system are held. The storage portion 210 may include 1U/2U/3U/6U/12U/24U CubeSats, other small satellites, and larger satellites. In one or more embodiments, the storage portion 210 may include only a portion (e.g., a 1U/2U/3U/6U/12U/24U sized portion) of a spacecraft (e.g., a 1U/3U/6U/12U/24U CubeSat). The spacecraft system 200 may also include one or more solar array apparatus 220, 230 similar to those described with respect to FIGS. 1A-11. As shown in FIGS. 13A-15, the spacecraft system 200 may include a first solar array apparatus 220 and a second solar array apparatus 230. Each of the first and second solar array apparatus 220, 230 includes at least one solar array 224, 234 coupled to the storage portion 210 and an extendable boom 225, 235 coupled to the storage portion 210 and couplable to the at least one solar array 224, 234. The at least one solar arrays 224, 234 and the extendable booms 225, 235 may be similar to those described with respect to FIGS. 1A-11.

The following discussion describes a spacecraft system 200 including a first and second solar array apparatus 220, 230, however, any number of solar array apparatus may be operable in the spacecraft system 200 as described herein. For example, the spacecraft system 200 may have one solar array apparatus, two solar array apparatus, three solar array apparatus, etc. Furthermore, the one or more solar array apparatus may be positioned anywhere on the spacecraft system 200. As shown, the at least one solar array 224 of the first solar array apparatus 220 extends in an opposite direction than the at least one solar array 234 of the second solar array apparatus 230 when the first and second solar array apparatus 220, 230 are in the deployed configuration.

Figure 15:
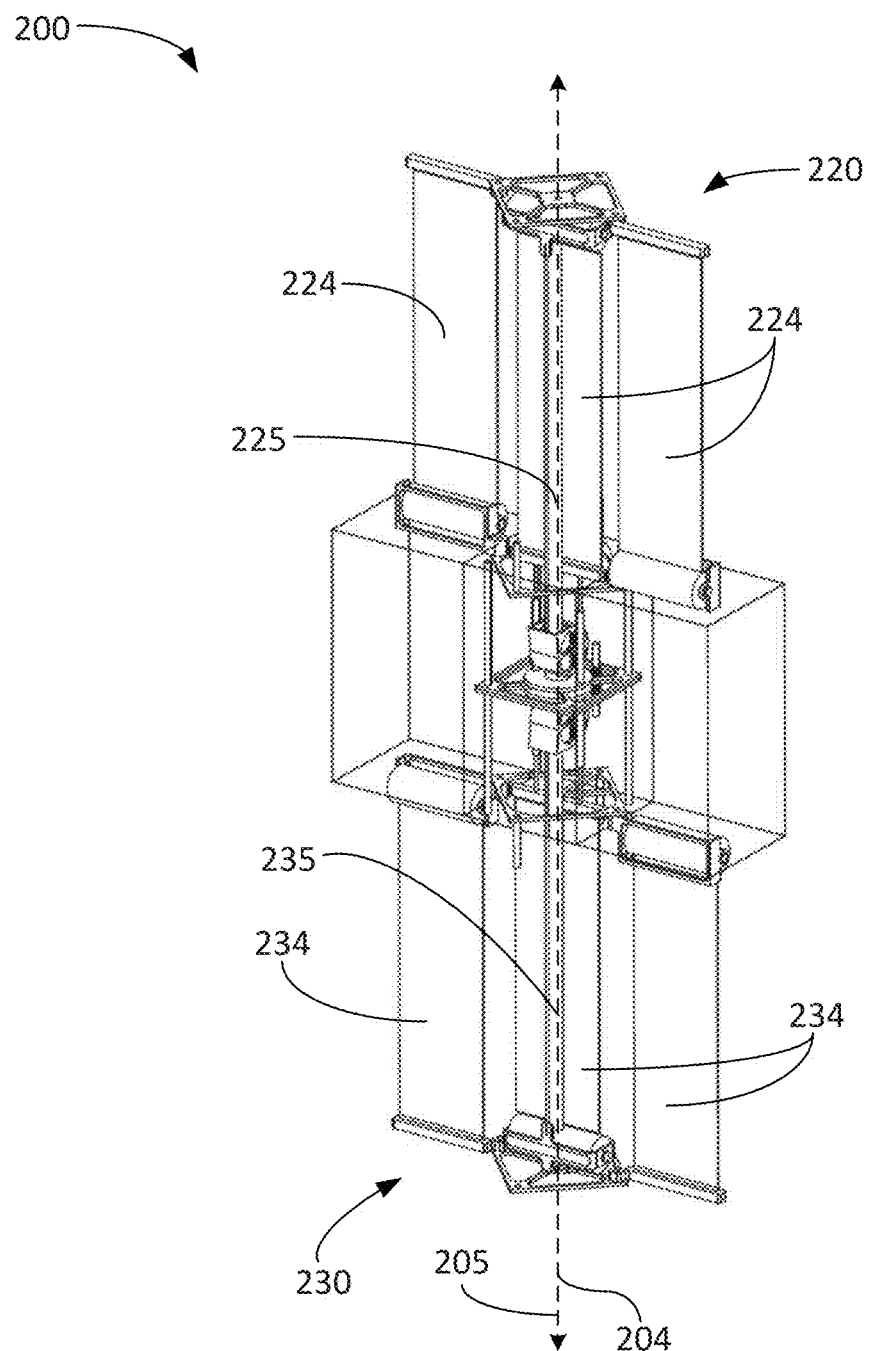
FIG. 15 is a perspective view of the exemplary spacecraft system of FIG. 13A when the solar array apparatus is in the deployed configuration.

The first and second solar apparatus 220, 230 may be configurable in at least a stowed configuration (see, e.g., FIGS. 13A-13B) and a deployed configuration (see, e.g., FIG. 15). The at least one solar array 224, 234 of the first and second solar array apparatus 220, 230 may be extended away from the storage portion 210 outside of the interior space 211 of the storage portion 210 to collect incident radiation when the first and second solar array apparatus 220, 230 are in the deployed configuration. The first and second solar array apparatus 220, 230 may operate, or extend, in combination or separate from one another. The first and second solar array apparatus 220, 230 may be stored within the interior space of the storage portion 210 when the first and second solar array apparatus 220, 230 are in the stowed configuration. In one or more embodiments, the first and second solar array apparatus 220, 230 may be located entirely within the interior space of the storage portion 210 when the first and second solar array apparatus 220, 230 are in the stowed configuration. When the first and second solar array apparatus 220, 230 are in the deployed configuration, each of the at least one solar arrays 224, 234 may have a rotational degree of freedom, about the spacecraft axis 204 (e.g., direction of extension), by which the at least one array 224, 234 may rotate to track the direction of the sun (e.g., using a stepper motor at the base of the extendable boom 225, 235).

The extendable boom 225, 235 of the first and second solar array apparatus 220, 230 may provide support (e.g., structural stiffness) to the at least one solar array 224, 234 and may be operable to configure the at least one solar array 224, 234 to, e.g., extend away from the storage portion 210, when the first and second solar array apparatus 220, 230 are in the deployed configuration. Further, the extendable boom 225, 235 of the first and second solar array apparatus 220, 230 may be biased (e.g., provide deployment energy) to extend along a boom axis 205 (e.g., same as spacecraft axis 204 in FIG. 15) and may be operable to configure the first and second solar array apparatus 220, 230 from the stowed configuration to the deployed configuration. As shown in FIG. 15, the boom axis 205 is the same for both the first solar array apparatus 220 and the second solar array apparatus 230. In other embodiments, the boom axis could be different for each of the first and second solar array apparatus 220, 230. The extendable boom 225, 235 of the first and second solar array apparatus 220, 230 may be restricted from movement when the first and second solar array apparatus 220, 230 is in the stowed configuration and released to extend along the boom axis 205 to configure the first and second solar array apparatus 220, 230 in the deployed configuration.

Figure 14A:
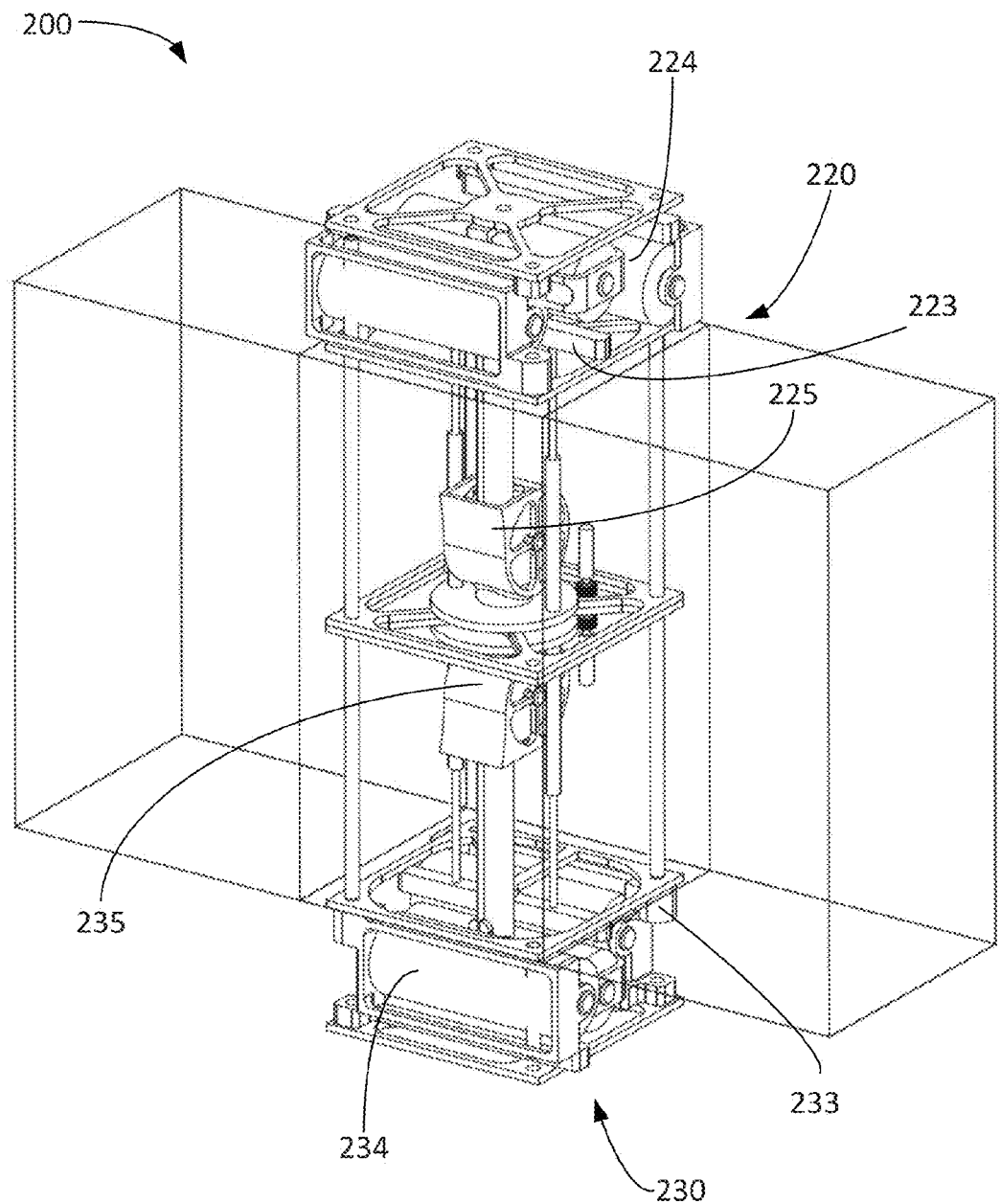
FIG. 14A is a perspective view of the exemplary spacecraft system of FIG. 13A when the solar array apparatus is between the stowed configuration and a deployed configuration.
Figure 14B:
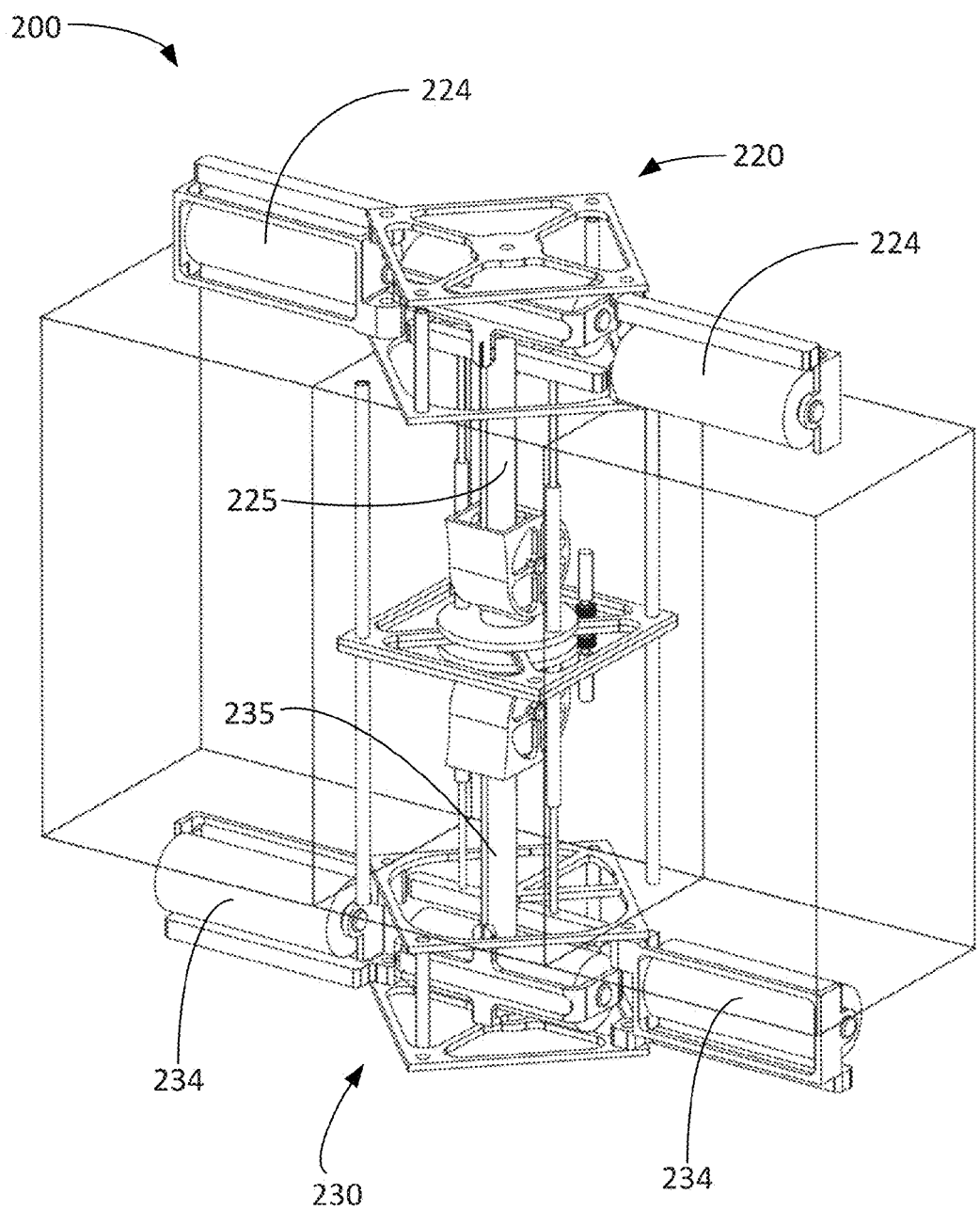
FIG. 14B is a perspective view of the exemplary spacecraft system of FIG. 13A when the solar array apparatus is between the stowed configuration and the deployed configuration.

In one or more embodiments, the first and second solar array apparatus 220, 230 may extend to intermediate positions between the stowed configuration and the deployed configuration. For example, the first and second solar array apparatus 220, 230 extend from the storage portion 210 to, e.g., expose the at least one solar array 224, 234 to be deployed (see, e.g., FIG. 14A). Further, the first and second solar array apparatus 220, 230 may include a release mechanism 223, 233. The release mechanism 223, 233 may restrict movement of the first and second solar array apparatus 220, 230 when the first and second solar array apparatus 220, 230 are in the stowed configuration. The release mechanism 223, 233 may also release the restriction of the movement of the first and second solar array apparatus 220, 230 such that the first and second solar array apparatus 220, 230 are configurable in the deployed configuration (or, e.g., released to an intermediate configuration as shown in FIG. 14A). Further, the at least one solar array 224, 234 of the first and second solar array apparatus 220, 230 may deploy (e.g., using a deployment actuator) to arrange the at least one solar array 224, 234 such that the at least one solar array 224, 234 may extend away from the storage portion 210 before the first and second solar array apparatus 220, 230 moves to the deployed configuration.

Figure 12A:
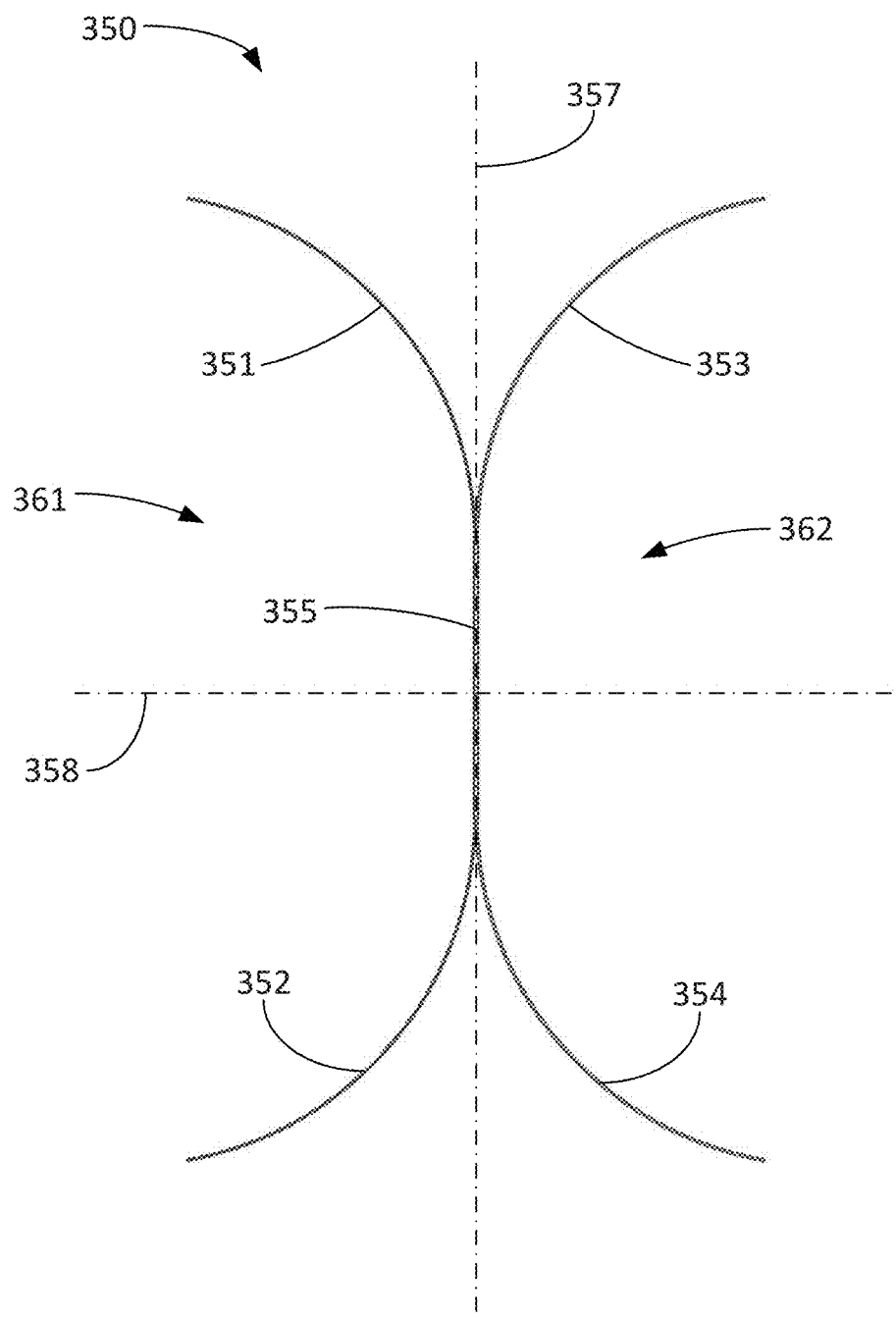
FIG. 12A is a cross section view of an extendable boom taken across line 12-12' of FIG. 12B.
Figure 12B:
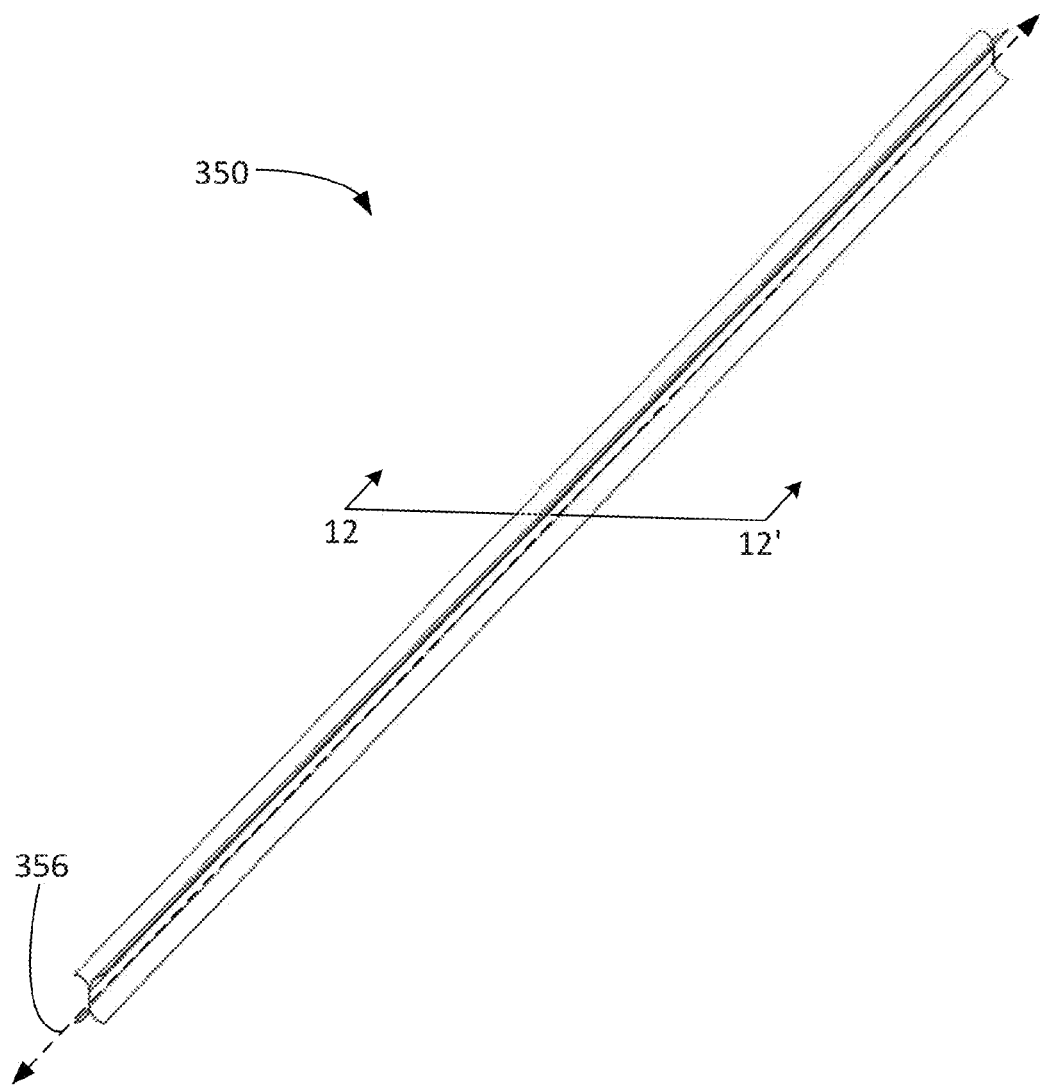
FIG. 12B is a perspective view of the extendable boom.
Figure 12C:
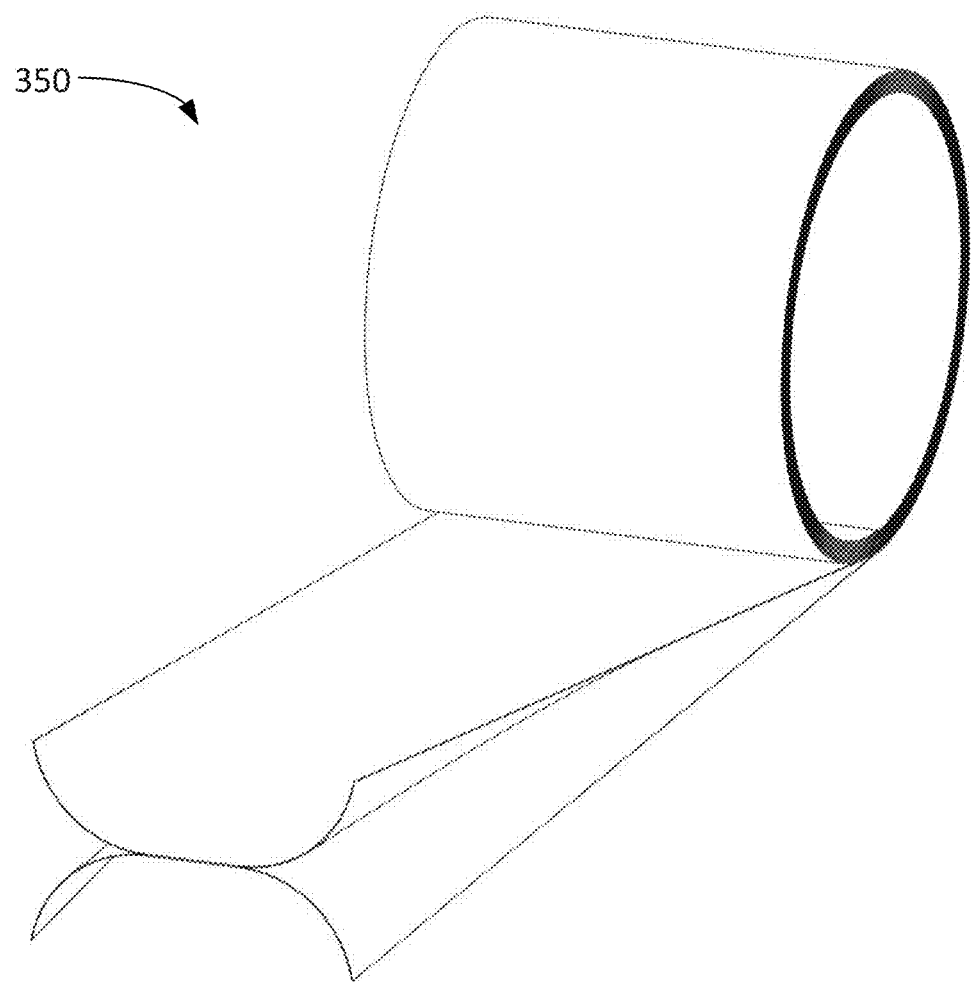
FIG. 12C is a perspective view of the extendable boom of FIG. 12A at least partially stowed.
Figure 13A:
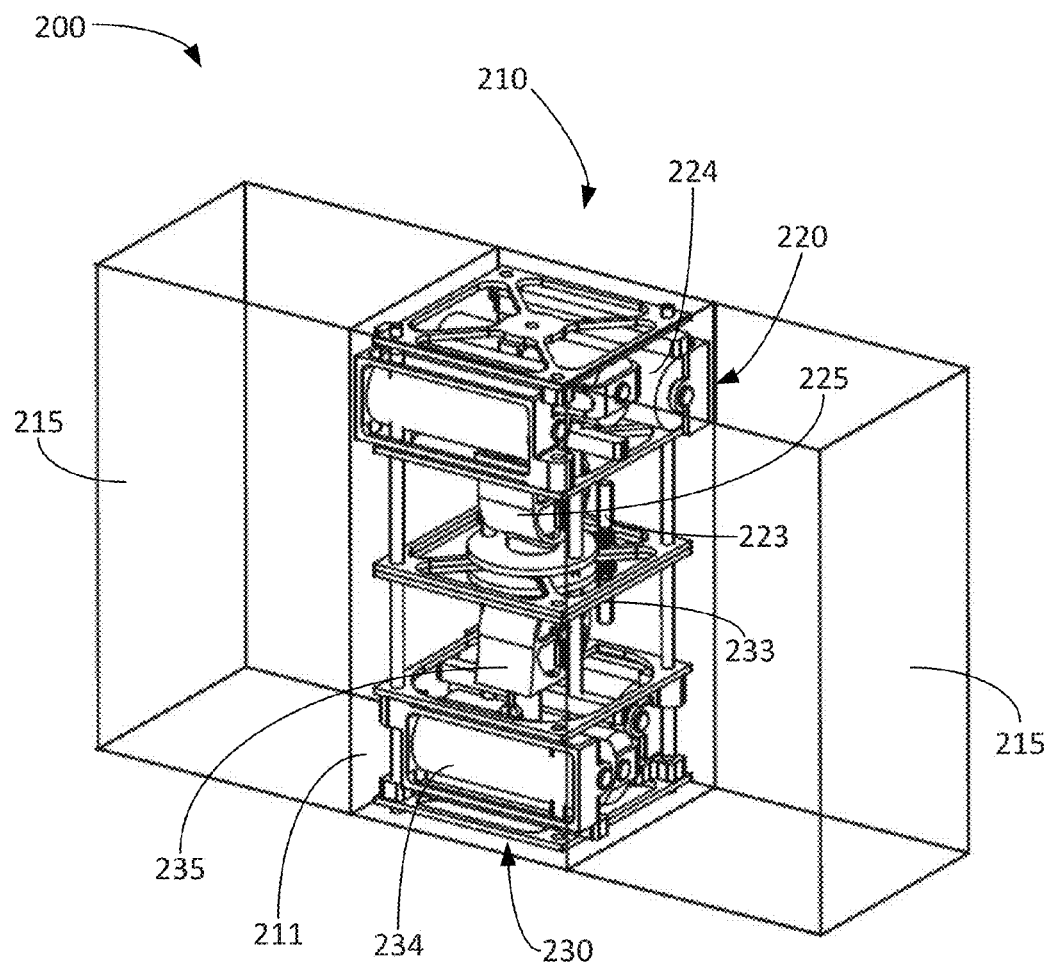
FIG. 13A is a perspective view of another exemplary spacecraft system including a solar array apparatus in a stowed configuration.
Figure 13B:
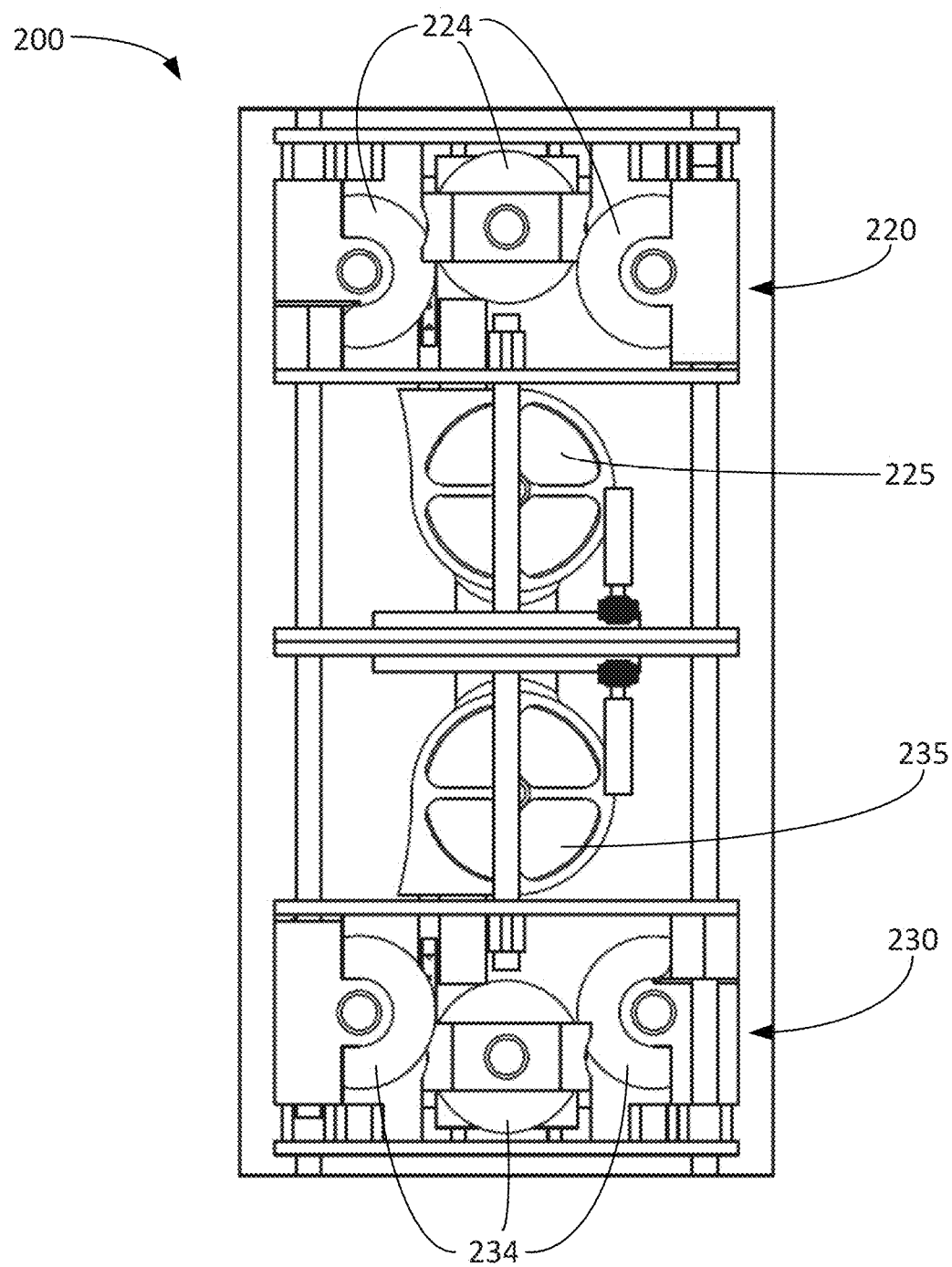
FIG. 13B is a side view of the exemplary spacecraft system of FIG. 13A when a solar array apparatus is in the stowed configuration.

In one or more embodiments, the extendable boom 350 as shown in FIGS. 12A-12C, may be a rollable boom that may be described as creating, or providing, a rigid beam configured to provide resistance to compression and/or bending loads. The extendable boom 350, as described with respect to FIGS. 12A-12C, may be the same as or similar to the extendable booms 150, 225, 235 described herein with respect to FIGS. 1A-11 and FIGS. 13A-15. As shown in FIGS. 12A-12C, the extendable boom 350 may include a web portion 355 (e.g., central portion) and a plurality of flange portions such as first flange portion 351, second flange portion 352, third flange portion 353, fourth flange portion 354, each extending from the web portion 355. It is to be understood that the "web" portion 355 may be described as the "web" portion 355 due to the similar to the web, or web region/portion, of an "I-beam."

The extendable boom 350 may be described as configurable in at least a normal, linear configuration (see, e.g., FIG. 12B) and a nonlinear configuration (see, e.g., FIG. 12C). The web portion 355 and the plurality of flange portions (e.g., the first, second, third, and/or fourth flange portion 351, 352, 353, 354) extend along a boom axis 356 (as shown in FIG. 12B) when the extendable boom 350 is in the normal, linear configuration (e.g., extended along an axis) and may extend nonlinearly (e.g., rolled, folded, curved, etc.) when the extendable boom is in the nonlinear configuration. For example, a first flange portion 351 may extend from the web portion 355 and a second flange portion 352 may extend from the web portion 355 opposite the first flange portion 351. The first flange portion 351, the second flange portion 352, and the web portion 355 may define a first concave surface 361 when the extendable boom 350 is configured in the linear configuration. Additionally, a third flange portion 353 may extend from the web portion 355 and a fourth flange portion 354 may extend from the web portion 355 opposite the third flange portion 353. The third flange portion 353, the fourth flange portion 354, and the web portion 355 may define a second concave surface 362 facing opposite the first concave surface 361 when the extendable boom 350 is configured in the linear configuration.

For example, the extendable boom 350 may be "rolled-up" when in the nonlinear configuration. Further, the extendable boom 350 may be flattened when in the nonlinear configuration, such that the first flange portion 351, the second flange portion 352, and the web portion 355 may lie substantially in a plane, and the third flange portion 353, the fourth flange portion 354, and the web portion 355 may lie substantially in a plane. Additionally, when the extendable boom 350 is in the nonlinear configuration, the first and third flange portions 351, 353 may be adjacent one another (e.g., in contact with each other, touching each other, etc.) and the second and fourth flange portions 352, 354 may be adjacent one another (e.g., in contact with each other, touching each other, etc.). In other words, the first and third flange portions 351, 353 may be located closer to each other when the extendable boom 350 is in the non-linear configuration than when the extendable boom 350 is in the linear configuration, and the second and fourth flange portions 352, 354 may be located closer to each other when the extendable boom 350 is in the non-linear configuration than when the extendable boom 350 is in the linear configuration.

The flange portions 351, 352, 353, 354 may be described as being "biased" into the non-linear configuration away from each other as opposed to being "flattened" and close to each other. In other words, the flanges 351, 352, 353, 354 may be described as springs that upon flattening, or straightening out, may desire to return to a curved position extending from the web portion 355. Thus, potential energy may be stored in the extendable boom 350 when "flattened" such that the flange portions are adjacent one another, and when the extendable boom 350 is released from being in a stowed configuration, the potential energy of the flange portions 351, 352, 353, 354 may be released thereby straightening the extendable boom 350 into the linear configuration (e.g., extending along the boom axis, etc.).

The extendable boom 350 is typically in the normal, linear configuration when the solar array apparatus is in the deployed configuration. The boom axis 356 may be parallel or the same as the spacecraft axis that extends from the first portion of the spacecraft system to the second portion of the spacecraft system. The extendable boom 350 is typically in the nonlinear configuration when the solar array apparatus is in the stowed configuration.

As shown in the cross-section of FIG. 12A (which is taken across the line 12-12' shown in FIG. 12B), the extendable boom 350 may be described as being symmetric across one or more axes perpendicular to the boom axis (e.g., the boom axis may extend out of the page in FIG. 12A, the axis upon which the boom lies when deployed or extended, boom axis 356 as shown in FIG. 12B). For example, the extendable boom 350 is symmetric across each of the two perpendicular axes 357, 358 depicted in FIG. 12A (e.g., axes of the cross-section depicted in FIG. 12A, which would be planes in the perspective view). The extendable boom 350 cross section shown in FIG. 12A is in a normal, linear (e.g., unrolled, deployed) configuration.

In other words, the extendable boom 350 may have an open cross section with a web portion 355 and four flanges 351, 352, 353, 354 configured so the flanges are symmetric about two axes 357, 358 of the cross-section (see, e.g., FIG. 12A). Further, this symmetry may provide a compression load path through the web portion 355 that is normal to the cross-section and centered about the center of the web portion 355. The four flanges 351, 352, 353, 354 may provide an increased area moment of inertia to increase buckling of the central web portion 355 relative to a non-symmetric rollable boom (e.g., TRAC). In the deployed (e.g., unrolled) state, or configuration, the four flanges 351, 352, 353, 354 may form arcs, or curves, that are tangent to the central web portion 355 to form an "X" or "I" type cross-section (see, e.g., FIGS. 12A-12B). More specifically, the "X" or "I" shape may be curved (e.g., the flanges, or legs, may extend along curved lines, the flanges, or legs, may not extend along straight lines, etc.) In the stowed (e.g., rolled) configuration, the flanges 351, 352, 353, 354 may be flat and in the same plane as the web portion 355 (see, e.g., FIG.

12C). This flattened configuration may provide a minimum cross section about an axis so that the extendable boom 350 may be rolled without plastically deforming the extendable boom 350. Further, strain energy may be stored in the extendable boom 350 by elastic deformation of the material, which may be used for passive deployment of the solar array apparatus.

The symmetric nature and/or properties of the exemplary extendable beam 350 described herein may be beneficial over other extendable beam designs. For example, the exemplary extendable beam 350 may provide additional structural support and rigidity, may be more reliable, may support more mass, etc. when compared to other designs.

In one or more embodiments, the extendable boom 350 may include (e.g. be formed of) two or more portions (e.g., portions may be described as lenticular springs). The two portions may be configured, or oriented, such that the convex surfaces face each other (see, e.g., the cross-sectional view of the boom in FIG. 12A). Additionally, the concave surfaces of each portions may face away (e.g., in an opposing direction), at least in part, from each other. In at least one embodiment, the two portions of the extendable boom may further be connected along a central region (e.g., the central region may be located between the first and second longitudinal edges regions of the two portions, web portion 355). Similar exemplary portions may be described in U.S. Pat. App. Pub. No. 2014/0042275 A1 filed on Aug. 9, 2013 and entitled "Gossamer Apparatus and Systems for Use with Spacecraft," which is incorporated herein by reference in its entirety.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the system and methods described herein. Various modifications of the illustrative embodiments, as well as additional embodiments of the disclosure, will be apparent upon reference to this description.

What is claimed:

1. A spacecraft system comprising:
    a first portion;
    a second portion, wherein the first and second portions are configured to store one or more electronic components; and
    a solar array apparatus comprising:
        at least one solar array coupled to each of the first and second portions, and
        an extendable boom coupled to each of the first and second portions,
        wherein the solar array apparatus is configurable in at least a stowed configuration and a deployed configuration, wherein the at least one solar array extends between the first portion and the second portion to collect incident radiation when the solar array apparatus is in the deployed configuration, wherein the extendable boom extends between the first portion and the second portion when the solar array apparatus is in the stowed configuration and the deployed configuration, wherein the first and second portions are located closer to each other when the solar array apparatus is in the stowed configuration than when in the deployed configuration, wherein the first and second portions are located farther away from each other when the solar array apparatus is in the deployed configuration than when in the stowed configuration.

2. The system of claim 1, wherein the extendable boom is biased to extend along a boom axis, wherein the extendable boom is operable to configure the solar array apparatus from the stowed configuration to the deployed configuration, wherein the extendable boom is restricted from movement when the solar array apparatus is in the stowed configuration, and wherein the extendable boom is released to extend along the boom axis to configure the solar array apparatus in the deployed configuration.

3. The system of claim 1, wherein the solar array apparatus further comprises a release mechanism, wherein the release mechanism restricts movement of the solar array apparatus when the solar array apparatus is in the stowed configuration and the release mechanism releases the restriction of the movement of the solar array apparatus such that the solar array apparatus is configurable in the deployed configuration.

4. The system of claim 1, wherein the solar array apparatus is biased to be configured in the deployed configuration, wherein the solar array apparatus further comprises a deployment actuator apparatus configured to restrict the at least one solar array from movement when the solar array apparatus is in the stowed configuration, and wherein the deployment actuator apparatus is configured to release the at least one solar array to configure the solar array apparatus in the deployed configuration.

5. The system of claim 1, wherein the first portion, the solar array apparatus, and the second portion are arranged along a spacecraft axis, wherein a perpendicular axis is perpendicular to the spacecraft axis,
    wherein a first moment of inertia is defined along the spacecraft axis and a second moment of inertia is defined along the perpendicular axis, wherein the second moment of inertia is greater than the first moment of inertia and results in a passive attitude orientation from gravity gradient forces.

6. The system of claim 1, wherein the at least one solar array extends along a solar array axis, wherein the at least one solar array defines a solar array width extending perpendicular to the solar array axis that is greater than a width of the first and second portion extending perpendicular to the solar array axis when the solar array apparatus is in the deployed configuration.

7. The system of claim 1, wherein the at least one solar array comprises thin-film photovoltaics.

8. The system of claim 1, wherein the at least one solar array is rolled up when the solar array apparatus is in the stowed configuration and the at least one solar array is unrolled when the solar array apparatus is in the deployed configuration.

9. A spacecraft system comprising:
    a storage portion defining an interior space and configured to be coupled to one or more payload portions configured to store one or more electronic components;
    a first solar array apparatus; and
    a second solar array apparatus, wherein each of the first and second solar array apparatus comprise:
        at least one solar array coupled to the storage portion, and
        an extendable boom coupled to the storage portion and couplable to the at least one solar array;
    wherein the first and second solar array apparatus are configurable in at least a stowed configuration and a deployed configuration, wherein the at least one solar array of the first and second solar array apparatus is extended away from the storage portion outside of the interior space of the storage portion to collect incident radiation when the first and second solar array apparatus are in the deployed configuration, wherein the first and second solar array apparatus are stored within the interior space of the storage portion when the first and second solar array apparatus are in the stowed configuration, wherein the extendable booms of the first and second solar array apparatus extend along a boom axis when in the deployed configuration, wherein the extendable booms of the first and second solar array apparatus provide support to the at least one solar arrays of the first and second solar array apparatus when the first and second solar array apparatus are in the deployed configuration.

10. The system of claim 9, wherein the extendable boom of the first and second solar array apparatus is biased to extend along a boom axis and is operable to configure the first and second solar array apparatus from the stowed configuration to the deployed configuration, wherein the extendable boom is restricted from movement when the first and second solar array apparatus is in the stowed configuration, and wherein the extendable boom is released to extend along the corresponding boom axis to configure the first and second solar array apparatus in the deployed configuration.

11. The system of claim 9, wherein the extendable boom comprises:
a web portion,
a first flange portion extending from the web portion,
a second flange portion extending from the web portion opposite the first flange portion,
a third flange portion extending from the web portion, and
a fourth flange portion extending from the web portion opposite the third flange portion,
wherein the first flange portion, the second flange portion, and the web portion define a first concave surface and the third flange portion, the fourth flange portion, and the web portion define a second concave surface facing opposite the first concave surface when the first and second solar array apparatus are in the deployed configuration.

12. The system of claim 9, wherein each of the first and second solar array apparatus further comprises a release mechanism, wherein the release mechanism restricts movement of the first and second solar array apparatus when the first and second solar array apparatus are in the stowed configuration and the release mechanism releases the restriction of the movement of the first and second solar array apparatus such that the first and second solar array apparatus are configurable in the deployed configuration.

13. The system of claim 9, wherein the first and second solar array apparatus are located entirely within the interior space of the storage portion when the first and second solar array apparatus are in the stowed configuration.

14. The system of claim 9, wherein the storage portion comprises 2U of a CubeSat.

15. A spacecraft system comprising:
a storage portion defining an interior space and configured to be coupled to one or more payload portions configured to store one or more electronic components; and
a solar array apparatus comprising:
at least one solar array coupled to the storage portion, and
an extendable boom coupled to the storage portion and couplable to the at least one solar array, wherein the extendable boom is biased to extend along a boom axis and comprises:
a web portion,
a first flange portion extending from the web portion,
a second flange portion extending from the web portion opposite the first flange portion,
a third flange portion extending from the web portion, and
a fourth flange portion extending from the web portion opposite the third flange portion, wherein the first flange portion, the second flange portion, and the web portion define a first concave surface and the third flange portion, the fourth flange portion, and the web portion define a second concave surface facing opposite the first concave surface when the solar array apparatus is in the deployed configuration;
wherein the solar array apparatus is configurable in at least a stowed configuration and a deployed configuration, wherein the at least one solar array of the solar array apparatus is extended away from the storage portion outside of the interior space of the storage portion to collect incident radiation when the solar array apparatus is in the deployed configuration, wherein the solar array apparatus is stored within the interior space of the storage portion when the solar array apparatus is in the stowed configuration,
wherein the extendable boom provides support to the at least one solar array and is operable to configure the at least one solar array to extend away from the storage portion when the solar array apparatus moves from the stowed configuration to the deployed configuration.

16. The system of claim 15, wherein the extendable boom is configurable in at least a normal, linear configuration and a nonlinear configuration, wherein the first flange portion, second flange portion, and web portion extends along the boom axis when in the normal, linear configuration and extends nonlinearly when in the nonlinear configuration.

17. The system of claim 15, wherein the extendable boom is symmetric about at least one symmetry axis perpendicular to the boom axis when in a normal, linear configuration.

18. The system of claim 15, wherein the extendable boom is symmetric about at least two symmetry axes, each of the at least two symmetry axes perpendicular to the boom axis when in a normal, linear configuration.

19. The system of claim 15, wherein the solar array apparatus further comprises a release mechanism, wherein the release mechanism restricts movement of the solar array apparatus when the solar array apparatus is in the stowed configuration and the release mechanism releases the restriction of the movement of the solar array apparatus such that the solar array apparatus is configurable in the deployed configuration.

20. The system of claim 15, wherein the solar array apparatus is located entirely within the interior space of the storage portion when the solar array apparatus is in the stowed configuration.

* * * * *